United States Patent
Guo et al.

(10) Patent No.: US 10,431,214 B2
(45) Date of Patent: Oct. 1, 2019

(54) SYSTEM AND METHOD OF DETERMINING A DOMAIN AND/OR AN ACTION RELATED TO A NATURAL LANGUAGE INPUT

(71) Applicant: VoiceBox Technologies Corporation, Bellevue, WA (US)

(72) Inventors: Yikun Guo, Bellevue, WA (US); Safiyyah Saleem, Bellevue, WA (US); Jiayuan Huang, Bellevue, WA (US)

(73) Assignee: Voicebox Technologies Corporation, Bellevue, WA (US)

( * ) Notice: Subject to any disclaimer, the term of this patent is extended or adjusted under 35 U.S.C. 154(b) by 0 days.

(21) Appl. No.: 14/951,389

(22) Filed: Nov. 24, 2015

(65) Prior Publication Data

US 2016/0148612 A1 May 26, 2016

Related U.S. Application Data

(60) Provisional application No. 62/085,029, filed on Nov. 26, 2014.

(51) Int. Cl.
*G10L 15/197* (2013.01)
*G10L 15/14* (2006.01)
(Continued)

(52) U.S. Cl.
CPC .............. *G10L 15/22* (2013.01); *G06F 17/27* (2013.01); *G10L 15/1815* (2013.01)

(58) Field of Classification Search
CPC ...... G10L 15/1815; G10L 15/22; G06F 17/27
(Continued)

(56) References Cited

U.S. PATENT DOCUMENTS

| 4,430,669 A | 2/1984 | Cheung |
| 4,821,027 A | 4/1989 | Mallory |

(Continued)

FOREIGN PATENT DOCUMENTS

| CN | 1433554 A | 7/2003 |
| CN | 1860496 A | 11/2006 |

(Continued)

OTHER PUBLICATIONS

Lin et al "A Distributed Architecture for Cooperative Spoken Dialogue Agents with Coherent Dialogue State and History", 1999. Retrieved online on Jan. 18, 2017 from <http://www.iis.sinica.edu. tw/~whm/publish/papers/asru99.pdf>.*

(Continued)

*Primary Examiner* — Lamont M Spooner
*Assistant Examiner* — Oluwadamilola M Ogunbiyi
(74) *Attorney, Agent, or Firm* — Ohlandt, Greeley, Ruggiero & Perle, L.L.P.

(57) ABSTRACT

The disclosure relates to methods, systems and other embodiments directed to determining an information domain match for a natural language (NL) input (e.g., a spoken utterance), and confirming whether the NL input is correctly matched to the information domain. For example, after receiving an NL input, a first information domain to which the NL input belongs and a feature value set may be determined based on a semantic pattern matching technique. Further, a second information domain to which the NL input belongs, and a corresponding confidence score related to the second information domain may be determined. The second information domain may be determined based on a first statistical classification technique. Based on the determined feature value set and the confidence score related to the second information domain, it may be confirmed whether the NL input correctly belongs to the first information (Continued)

domain, e.g., based on a second statistical classification technique.

20 Claims, 10 Drawing Sheets

(51) Int. Cl.
  *G10L 15/18* (2013.01)
  *G06F 17/27* (2006.01)
  *G10L 15/22* (2006.01)
(58) Field of Classification Search
  USPC .......................................................... 704/257
  See application file for complete search history.

(56) References Cited

U.S. PATENT DOCUMENTS

| | | | |
|---|---|---|---|
| 4,829,423 A | 5/1989 | Tennant | |
| 4,887,212 A | 12/1989 | Zamora | |
| 4,910,784 A | 3/1990 | Doddington | |
| 5,027,406 A | 6/1991 | Roberts | |
| 5,155,743 A | 10/1992 | Jacobs | |
| 5,164,904 A | 11/1992 | Sumner | |
| 5,208,748 A | 5/1993 | Flores | |
| 5,265,065 A | 11/1993 | Turtle | |
| 5,274,560 A | 12/1993 | LaRue | |
| 5,331,554 A * | 7/1994 | Graham | G06F 17/30259 |
| 5,357,596 A | 10/1994 | Takebayashi | |
| 5,369,575 A | 11/1994 | Lamberti | |
| 5,377,350 A | 12/1994 | Skinner | |
| 5,386,556 A | 1/1995 | Hedin | |
| 5,424,947 A | 6/1995 | Nagao | |
| 5,471,318 A | 11/1995 | Ahuja | |
| 5,475,733 A | 12/1995 | Eisdorfer | |
| 5,479,563 A | 12/1995 | Yamaguchi | |
| 5,488,652 A | 1/1996 | Bielby | |
| 5,499,289 A | 3/1996 | Bruno | |
| 5,500,920 A | 3/1996 | Kupiec | |
| 5,517,560 A | 5/1996 | Greenspan | |
| 5,533,108 A | 7/1996 | Harris | |
| 5,537,436 A | 7/1996 | Bottoms | |
| 5,539,744 A | 7/1996 | Chu | |
| 5,557,667 A | 9/1996 | Bruno | |
| 5,559,864 A | 9/1996 | Kennedy, Jr. | |
| 5,563,937 A | 10/1996 | Bruno | |
| 5,577,165 A | 11/1996 | Takebayashi | |
| 5,590,039 A | 12/1996 | Ikeda | |
| 5,608,635 A | 3/1997 | Tamai | |
| 5,615,296 A | 3/1997 | Stanford | |
| 5,617,407 A | 4/1997 | Bareis | |
| 5,633,922 A | 5/1997 | August | |
| 5,634,086 A | 5/1997 | Rtischev | |
| 5,652,570 A | 7/1997 | Lepkofker | |
| 5,675,629 A | 10/1997 | Raffel | |
| 5,696,965 A | 12/1997 | Dedrick | |
| 5,708,422 A | 1/1998 | Blonder | |
| 5,721,938 A | 2/1998 | Stuckey | |
| 5,722,084 A | 2/1998 | Chakrin | |
| 5,740,256 A | 4/1998 | CastelloDaCosta | |
| 5,742,763 A | 4/1998 | Jones | |
| 5,748,841 A | 5/1998 | Morin | |
| 5,748,974 A | 5/1998 | Johnson | |
| 5,752,052 A | 5/1998 | Richardson | |
| 5,754,784 A | 5/1998 | Garland | |
| 5,761,631 A | 6/1998 | Nasukawa | |
| 5,774,841 A | 6/1998 | Salazar | |
| 5,774,859 A | 6/1998 | Houser | |
| 5,794,050 A | 8/1998 | Dahlgren | |
| 5,794,196 A | 8/1998 | Yegnanarayanan | |
| 5,797,112 A | 8/1998 | Komatsu | |
| 5,799,276 A | 8/1998 | Komissarchik | |
| 5,802,510 A | 9/1998 | Jones | |
| 5,829,000 A | 10/1998 | Huang | |
| 5,832,221 A | 11/1998 | Jones | |
| 5,839,107 A | 11/1998 | Gupta | |
| 5,848,396 A | 12/1998 | Gerace | |
| 5,855,000 A | 12/1998 | Waibel | |
| 5,867,817 A | 2/1999 | Catallo | |
| 5,878,385 A | 3/1999 | Bralich | |
| 5,878,386 A | 3/1999 | Coughlin | |
| 5,892,813 A | 4/1999 | Morin | |
| 5,892,900 A | 4/1999 | Ginter | |
| 5,895,464 A | 4/1999 | Bhandari | |
| 5,895,466 A | 4/1999 | Goldberg | |
| 5,897,613 A | 4/1999 | Chan | |
| 5,899,991 A | 5/1999 | Karch | |
| 5,902,347 A | 5/1999 | Backman | |
| 5,911,120 A | 6/1999 | Jarett | |
| 5,918,222 A | 6/1999 | Fukui | |
| 5,926,784 A | 7/1999 | Richardson | |
| 5,933,822 A | 8/1999 | Braden-Harder | |
| 5,950,167 A | 9/1999 | Yaker | |
| 5,953,393 A | 9/1999 | Culbreth | |
| 5,960,384 A | 9/1999 | Brash | |
| 5,960,397 A | 9/1999 | Rahim | |
| 5,960,399 A | 9/1999 | Barclay | |
| 5,960,447 A | 9/1999 | Holt | |
| 5,963,894 A | 10/1999 | Richardson | |
| 5,963,940 A | 10/1999 | Liddy | |
| 5,983,190 A | 11/1999 | Trower, II | |
| 5,987,404 A | 11/1999 | DellaPietra | |
| 5,991,721 A | 11/1999 | Asano | |
| 5,995,119 A | 11/1999 | Cosatto | |
| 5,995,928 A | 11/1999 | Nguyen | |
| 5,995,943 A | 11/1999 | Bull | |
| 6,009,382 A | 12/1999 | Martino | |
| 6,014,559 A | 1/2000 | Amin | |
| 6,018,708 A | 1/2000 | Dahan | |
| 6,021,384 A | 2/2000 | Gorin | |
| 6,028,514 A | 2/2000 | Lemelson | |
| 6,035,267 A | 3/2000 | Watanabe | |
| 6,044,347 A | 3/2000 | Abella | |
| 6,049,602 A | 4/2000 | Foladare | |
| 6,049,607 A | 4/2000 | Marash | |
| 6,058,187 A | 5/2000 | Chen | |
| 6,067,513 A | 5/2000 | Ishimitsu | |
| 6,073,098 A | 6/2000 | Buchsbaum | |
| 6,076,059 A | 6/2000 | Glickman | |
| 6,078,886 A | 6/2000 | Dragosh | |
| 6,081,774 A | 6/2000 | deHita | |
| 6,085,186 A | 7/2000 | Christianson | |
| 6,101,241 A | 8/2000 | Boyce | |
| 6,108,631 A | 8/2000 | Ruhl | |
| 6,119,087 A | 9/2000 | Kuhn | |
| 6,119,101 A | 9/2000 | Peckover | |
| 6,122,613 A | 9/2000 | Baker | |
| 6,134,235 A | 10/2000 | Goldman | |
| 6,144,667 A | 11/2000 | Doshi | |
| 6,144,938 A | 11/2000 | Surace | |
| 6,154,526 A | 11/2000 | Dahlke | |
| 6,160,883 A | 12/2000 | Jackson | |
| 6,167,377 A | 12/2000 | Gillick | |
| 6,173,266 B1 | 1/2001 | Marx | |
| 6,173,279 B1 | 1/2001 | Levin | |
| 6,175,858 B1 | 1/2001 | Bulfer | |
| 6,185,535 B1 | 2/2001 | Hedin | |
| 6,188,982 B1 | 2/2001 | Chiang | |
| 6,192,110 B1 | 2/2001 | Abella | |
| 6,192,338 B1 | 2/2001 | Haszto | |
| 6,195,634 B1 | 2/2001 | Dudemaine | |
| 6,195,651 B1 | 2/2001 | Handel | |
| 6,199,043 B1 | 3/2001 | Happ | |
| 6,208,964 B1 | 3/2001 | Sabourin | |
| 6,208,972 B1 | 3/2001 | Grant | |
| 6,219,346 B1 | 4/2001 | Maxemchuk | |
| 6,219,643 B1 | 4/2001 | Cohen | |
| 6,219,645 B1 | 4/2001 | Byers | |
| 6,226,612 B1 | 5/2001 | Srenger | |
| 6,233,556 B1 | 5/2001 | Teunen | |
| 6,233,559 B1 | 5/2001 | Balakrishnan | |
| 6,233,561 B1 | 5/2001 | Junqua | |
| 6,236,968 B1 | 5/2001 | Kanevsky | |
| 6,243,679 B1 | 6/2001 | Mohri | |

(56) References Cited

U.S. PATENT DOCUMENTS

| | | |
|---|---|---|
| 6,246,981 B1 | 6/2001 | Papineni |
| 6,246,990 B1 | 6/2001 | Happ |
| 6,266,636 B1 | 7/2001 | Kosaka |
| 6,269,336 B1 | 7/2001 | Ladd |
| 6,272,455 B1 | 8/2001 | Hoshen |
| 6,272,461 B1 | 8/2001 | Meredith |
| 6,275,231 B1 | 8/2001 | Obradovich |
| 6,278,377 B1 | 8/2001 | DeLine |
| 6,278,968 B1 | 8/2001 | Franz |
| 6,286,002 B1 | 9/2001 | Axaopoulos |
| 6,288,319 B1 | 9/2001 | Catona |
| 6,292,767 B1 | 9/2001 | Jackson |
| 6,301,560 B1 | 10/2001 | Masters |
| 6,308,151 B1 | 10/2001 | Smith |
| 6,311,159 B1 | 10/2001 | VanTichelen |
| 6,314,402 B1 | 11/2001 | Monaco |
| 6,321,196 B1 | 11/2001 | Franceschi |
| 6,356,869 B1 | 3/2002 | Chapados |
| 6,362,748 B1 | 3/2002 | Huang |
| 6,366,882 B1 | 4/2002 | Bijl |
| 6,366,886 B1 | 4/2002 | Dragosh |
| 6,374,214 B1 | 4/2002 | Friedland |
| 6,374,226 B1 | 4/2002 | Hunt |
| 6,377,913 B1 | 4/2002 | Coffman |
| 6,381,535 B1 | 4/2002 | Durocher |
| 6,385,596 B1 | 5/2002 | Wiser |
| 6,385,646 B1 | 5/2002 | Brown |
| 6,389,398 B1 | 5/2002 | Lustgarten |
| 6,393,403 B1 | 5/2002 | Majaniemi |
| 6,393,428 B1 | 5/2002 | Miller |
| 6,397,181 B1 | 5/2002 | Li |
| 6,404,878 B1 | 6/2002 | Jackson |
| 6,405,170 B1 | 6/2002 | Phillips |
| 6,408,272 B1 | 6/2002 | White |
| 6,411,810 B1 | 6/2002 | Maxemchuk |
| 6,411,893 B2 | 6/2002 | Ruhl |
| 6,415,257 B1 | 7/2002 | Junqua |
| 6,418,210 B1 | 7/2002 | Sayko |
| 6,420,975 B1 | 7/2002 | DeLine |
| 6,429,813 B2 | 8/2002 | Feigen |
| 6,430,285 B1 | 8/2002 | Bauer |
| 6,430,531 B1 | 8/2002 | Polish |
| 6,434,523 B1 | 8/2002 | Monaco |
| 6,434,524 B1 | 8/2002 | Weber |
| 6,434,529 B1 | 8/2002 | Walker |
| 6,442,522 B1 | 8/2002 | Carberry |
| 6,446,114 B1 | 9/2002 | Bulfer |
| 6,453,153 B1 | 9/2002 | Bowker |
| 6,453,292 B2 | 9/2002 | Ramaswamy |
| 6,456,711 B1 | 9/2002 | Cheung |
| 6,456,974 B1 | 9/2002 | Baker |
| 6,466,654 B1 | 10/2002 | Cooper |
| 6,466,899 B1 | 10/2002 | Yano |
| 6,470,315 B1 | 10/2002 | Netsch |
| 6,487,494 B2 | 11/2002 | Odinak |
| 6,487,495 B1 | 11/2002 | Gale |
| 6,498,797 B1 | 12/2002 | Anerousis |
| 6,499,013 B1 | 12/2002 | Weber |
| 6,501,833 B2 | 12/2002 | Phillips |
| 6,501,834 B1 | 12/2002 | Milewski |
| 6,505,155 B1 | 1/2003 | Vanbuskirk |
| 6,510,417 B1 | 1/2003 | Woods |
| 6,513,006 B2 | 1/2003 | Howard |
| 6,522,746 B1 | 2/2003 | Marchok |
| 6,523,061 B1 | 2/2003 | Halverson |
| 6,532,444 B1 | 3/2003 | Weber |
| 6,539,348 B1 | 3/2003 | Bond |
| 6,549,629 B2 | 4/2003 | Finn |
| 6,553,372 B1 | 4/2003 | Brassell |
| 6,556,970 B1 | 4/2003 | Sasaki |
| 6,556,973 B1 | 4/2003 | Lewin |
| 6,560,576 B1 | 5/2003 | Cohen |
| 6,560,590 B1 | 5/2003 | Shwe |
| 6,567,778 B1 | 5/2003 | ChaoChang |
| 6,567,797 B1 | 5/2003 | Schuetze |
| 6,567,805 B1 | 5/2003 | Johnson |
| 6,570,555 B1 | 5/2003 | Prevost |
| 6,570,964 B1 | 5/2003 | Murveit |
| 6,571,279 B1 | 5/2003 | Herz |
| 6,574,597 B1 | 6/2003 | Mohri |
| 6,574,624 B1 | 6/2003 | Johnson |
| 6,578,022 B1 | 6/2003 | Foulger |
| 6,581,103 B1 | 6/2003 | Dengler |
| 6,584,439 B1 | 6/2003 | Geilhufe |
| 6,587,858 B1 | 7/2003 | Strazza |
| 6,591,185 B1 | 7/2003 | Polidi |
| 6,591,239 B1 | 7/2003 | McCall |
| 6,594,257 B1 | 7/2003 | Doshi |
| 6,594,367 B1 | 7/2003 | Marash |
| 6,598,018 B1 | 7/2003 | Junqua |
| 6,601,026 B2 | 7/2003 | Appelt |
| 6,601,029 B1 | 7/2003 | Pickering |
| 6,604,075 B1 | 8/2003 | Brown |
| 6,604,077 B2 | 8/2003 | Dragosh |
| 6,606,598 B1 | 8/2003 | Holthouse |
| 6,611,692 B2 | 8/2003 | Raffel |
| 6,614,773 B1 | 9/2003 | Maxemchuk |
| 6,615,172 B1 | 9/2003 | Bennett |
| 6,622,119 B1 | 9/2003 | Ramaswamy |
| 6,629,066 B1 | 9/2003 | Jackson |
| 6,631,346 B1 | 10/2003 | Karaorman |
| 6,631,351 B1 | 10/2003 | Ramachandran |
| 6,633,846 B1 | 10/2003 | Bennett |
| 6,636,790 B1 | 10/2003 | Lightner |
| 6,643,620 B1 | 11/2003 | Contolini |
| 6,647,363 B2 | 11/2003 | Claassen |
| 6,650,747 B1 | 11/2003 | Bala |
| 6,658,388 B1 | 12/2003 | Kleindienst |
| 6,678,680 B1 | 1/2004 | Woo |
| 6,681,206 B1 | 1/2004 | Gorin |
| 6,691,151 B1 | 2/2004 | Cheyer |
| 6,701,294 B1 | 3/2004 | Ball |
| 6,704,396 B2 | 3/2004 | Parolkar |
| 6,704,576 B1 | 3/2004 | Brachman |
| 6,704,708 B1 | 3/2004 | Pickering |
| 6,707,421 B1 | 3/2004 | Drury |
| 6,708,150 B1 | 3/2004 | Hirayama |
| 6,721,001 B1 | 4/2004 | Berstis |
| 6,721,633 B2 | 4/2004 | Funk |
| 6,721,706 B1 | 4/2004 | Strubbe |
| 6,726,636 B2 | 4/2004 | DerGhazarian |
| 6,732,088 B1 | 5/2004 | Glance |
| 6,735,592 B1 | 5/2004 | Neumann |
| 6,739,556 B1 | 5/2004 | Langston |
| 6,741,931 B1 | 5/2004 | Kohut |
| 6,742,021 B1 | 5/2004 | Halverson |
| 6,745,161 B1 | 6/2004 | Arnold |
| 6,751,591 B1 | 6/2004 | Gorin |
| 6,751,612 B1 | 6/2004 | Schuetze |
| 6,754,485 B1 | 6/2004 | Obradovich |
| 6,754,627 B2 | 6/2004 | Woodward |
| 6,754,647 B1 | 6/2004 | Tackett |
| 6,757,544 B2 | 6/2004 | Rangarajan |
| 6,757,718 B1 | 6/2004 | Halverson |
| 6,785,651 B1 | 8/2004 | Wang |
| 6,795,808 B1 | 9/2004 | Strubbe |
| 6,801,604 B2 | 10/2004 | Maes |
| 6,801,893 B1 | 10/2004 | Backfried |
| 6,804,330 B1 | 10/2004 | Jones |
| 6,810,375 B1 | 10/2004 | Ejerhed |
| 6,813,341 B1 | 11/2004 | Mahoney |
| 6,816,830 B1 | 11/2004 | Kempe |
| 6,829,603 B1 | 12/2004 | Chai |
| 6,832,230 B1 | 12/2004 | Zilliacus |
| 6,833,848 B1 | 12/2004 | Wolff |
| 6,850,603 B1 | 2/2005 | Eberle |
| 6,856,990 B2 | 2/2005 | Barile |
| 6,865,481 B2 | 3/2005 | Kawazoe |
| 6,868,380 B2 | 3/2005 | Kroeker |
| 6,868,385 B1 | 3/2005 | Gerson |
| 6,871,179 B1 | 3/2005 | Kist |
| 6,873,837 B1 | 3/2005 | Yoshioka |
| 6,877,001 B2 | 4/2005 | Wolf |
| 6,877,134 B1 | 4/2005 | Fuller |

(56) References Cited

U.S. PATENT DOCUMENTS

| | | |
|---|---|---|
| 6,882,970 B1 | 4/2005 | Garner |
| 6,901,366 B1 | 5/2005 | Kuhn |
| 6,910,003 B1 | 6/2005 | Arnold |
| 6,912,498 B2 | 6/2005 | Stevens |
| 6,915,126 B2 | 7/2005 | Mazzara, Jr. |
| 6,928,614 B1 | 8/2005 | Everhart |
| 6,934,756 B2 | 8/2005 | Maes |
| 6,937,977 B2 | 8/2005 | Gerson |
| 6,937,982 B2 | 8/2005 | Kitaoka |
| 6,941,266 B1 | 9/2005 | Gorin |
| 6,944,594 B2 | 9/2005 | Busayapongchai |
| 6,950,821 B2 | 9/2005 | Faybishenko |
| 6,954,755 B2 | 10/2005 | Reisman |
| 6,959,276 B2 | 10/2005 | Droppo |
| 6,961,700 B2 | 11/2005 | Mitchell |
| 6,963,759 B1 | 11/2005 | Gerson |
| 6,964,023 B2 | 11/2005 | Maes |
| 6,968,311 B2 | 11/2005 | Knockeart |
| 6,973,387 B2 | 12/2005 | Masclet |
| 6,975,993 B1 | 12/2005 | Keiller |
| 6,980,092 B2 | 12/2005 | Turnbull |
| 6,983,055 B2 | 1/2006 | Luo |
| 6,990,513 B2 | 1/2006 | Belfiore |
| 6,996,531 B2 | 2/2006 | Korall |
| 7,003,463 B1 | 2/2006 | Maes |
| 7,016,849 B2 | 3/2006 | Arnold |
| 7,020,609 B2 | 3/2006 | Thrift |
| 7,024,364 B2 | 4/2006 | Guerra |
| 7,027,586 B2 | 4/2006 | Bushey |
| 7,027,974 B1 | 4/2006 | Busch |
| 7,027,975 B1 | 4/2006 | Pazandak |
| 7,035,415 B2 | 4/2006 | Belt |
| 7,036,128 B1 | 4/2006 | Julia |
| 7,043,425 B2 | 5/2006 | Pao |
| 7,054,817 B2 | 5/2006 | Shao |
| 7,058,890 B2 | 6/2006 | George |
| 7,062,488 B1 | 6/2006 | Reisman |
| 7,069,220 B2 | 6/2006 | Coffman |
| 7,072,834 B2 | 7/2006 | Zhou |
| 7,072,888 B1 | 7/2006 | Perkins |
| 7,076,362 B2 | 7/2006 | Ohtsuji |
| 7,082,469 B2 | 7/2006 | Gold |
| 7,085,708 B2 | 8/2006 | Manson |
| 7,092,928 B1 | 8/2006 | Elad |
| 7,107,210 B2 | 9/2006 | Deng |
| 7,107,218 B1 | 9/2006 | Preston |
| 7,110,951 B1 | 9/2006 | Lemelson |
| 7,127,395 B1 | 10/2006 | Gorin |
| 7,127,400 B2 | 10/2006 | Koch |
| 7,130,390 B2 | 10/2006 | Abburi |
| 7,136,875 B2 | 11/2006 | Anderson |
| 7,137,126 B1 | 11/2006 | Coffman |
| 7,143,037 B1 | 11/2006 | Chestnut |
| 7,143,039 B1 | 11/2006 | Stifelman |
| 7,146,319 B2 | 12/2006 | Hunt |
| 7,149,696 B2 | 12/2006 | Shimizu |
| 7,165,028 B2 | 1/2007 | Gong |
| 7,170,993 B2 | 1/2007 | Anderson |
| 7,171,291 B2 | 1/2007 | Obradovich |
| 7,174,300 B2 | 2/2007 | Bush |
| 7,177,798 B2 | 2/2007 | Hsu |
| 7,184,957 B2 | 2/2007 | Brookes |
| 7,190,770 B2 | 3/2007 | Ando |
| 7,197,069 B2 | 3/2007 | Agazzi |
| 7,197,460 B1 | 3/2007 | Gupta |
| 7,203,644 B2 | 4/2007 | Anderson |
| 7,206,418 B2 | 4/2007 | Yang |
| 7,207,011 B2 | 4/2007 | Mulvey |
| 7,215,941 B2 | 5/2007 | Beckmann |
| 7,228,276 B2 | 6/2007 | Omote |
| 7,231,343 B1 | 6/2007 | Treadgold |
| 7,236,923 B1 | 6/2007 | Gupta |
| 7,254,482 B2 | 8/2007 | Kawasaki |
| 7,272,212 B2 | 9/2007 | Eberle |
| 7,277,854 B2 | 10/2007 | Bennett |
| 7,283,829 B2 | 10/2007 | Christenson |
| 7,283,951 B2 | 10/2007 | Marchisio |
| 7,289,606 B2 | 10/2007 | Sibal |
| 7,299,186 B2 | 11/2007 | Kuzunuki |
| 7,301,093 B2 | 11/2007 | Sater |
| 7,305,381 B1 | 12/2007 | Poppink |
| 7,321,850 B2 | 1/2008 | Wakita |
| 7,328,155 B2 | 2/2008 | Endo |
| 7,337,116 B2 | 2/2008 | Charlesworth |
| 7,340,040 B1 | 3/2008 | Saylor |
| 7,366,285 B2 | 4/2008 | Parolkar |
| 7,366,669 B2 | 4/2008 | Nishitani |
| 7,376,645 B2 | 5/2008 | Bernard |
| 7,386,443 B1 | 6/2008 | Parthasarathy |
| 7,398,209 B2 | 7/2008 | Kennewick |
| 7,406,421 B2 | 7/2008 | Odinak |
| 7,415,100 B2 | 8/2008 | Cooper |
| 7,415,414 B2 | 8/2008 | Azara |
| 7,421,393 B1 | 9/2008 | DiFabbrizio |
| 7,424,431 B2 | 9/2008 | Greene |
| 7,447,635 B1 | 11/2008 | Konopka |
| 7,451,088 B1 | 11/2008 | Ehlen |
| 7,454,368 B2 | 11/2008 | Stillman |
| 7,454,608 B2 | 11/2008 | Gopalakrishnan |
| 7,461,059 B2 | 12/2008 | Richardson |
| 7,472,020 B2 | 12/2008 | Brulle-Drews |
| 7,472,060 B1 | 12/2008 | Gorin |
| 7,472,075 B2 | 12/2008 | Odinak |
| 7,477,909 B2 | 1/2009 | Roth |
| 7,478,036 B2 | 1/2009 | Shen |
| 7,487,088 B1 | 2/2009 | Gorin |
| 7,487,110 B2 | 2/2009 | Bennett |
| 7,493,259 B2 | 2/2009 | Jones |
| 7,493,559 B1 | 2/2009 | Wolff |
| 7,502,672 B1 | 3/2009 | Kolls |
| 7,502,738 B2 | 3/2009 | Kennewick |
| 7,516,076 B2 | 4/2009 | Walker |
| 7,529,657 B2 * | 5/2009 | Wang .................. G06F 17/27 454/74 |
| 7,529,675 B2 | 5/2009 | Maes |
| 7,536,297 B2 | 5/2009 | Byrd |
| 7,536,374 B2 | 5/2009 | Au |
| 7,542,894 B2 | 6/2009 | Murata |
| 7,546,382 B2 | 6/2009 | Healey |
| 7,548,491 B2 | 6/2009 | Macfarlane |
| 7,552,054 B1 | 6/2009 | Stifelman |
| 7,558,730 B2 | 7/2009 | Davis |
| 7,574,362 B2 | 8/2009 | Walker |
| 7,577,244 B2 | 8/2009 | Taschereau |
| 7,606,708 B2 | 10/2009 | Hwang |
| 7,606,712 B1 | 10/2009 | Smith |
| 7,620,549 B2 | 11/2009 | DiCristo |
| 7,634,409 B2 | 12/2009 | Kennewick |
| 7,640,006 B2 | 12/2009 | Portman |
| 7,640,160 B2 | 12/2009 | DiCristo |
| 7,640,272 B2 | 12/2009 | Mahajan |
| 7,672,931 B2 | 3/2010 | Hurst-Hiller |
| 7,676,365 B2 | 3/2010 | Hwang |
| 7,676,369 B2 | 3/2010 | Fujimoto |
| 7,684,977 B2 | 3/2010 | Morikawa |
| 7,693,720 B2 | 4/2010 | Kennewick |
| 7,697,673 B2 | 4/2010 | Chiu |
| 7,706,616 B2 | 4/2010 | Kristensson |
| 7,729,916 B2 | 6/2010 | Coffman |
| 7,729,918 B2 | 6/2010 | Walker |
| 7,729,920 B2 | 6/2010 | Chaar |
| 7,734,287 B2 | 6/2010 | Ying |
| 7,748,021 B2 | 6/2010 | Obradovich |
| 7,788,084 B2 | 8/2010 | Brun |
| 7,792,257 B1 | 9/2010 | Vanier |
| 7,801,731 B2 | 9/2010 | Odinak |
| 7,809,570 B2 | 10/2010 | Kennewick |
| 7,818,176 B2 | 10/2010 | Freeman |
| 7,831,426 B2 | 11/2010 | Bennett |
| 7,831,433 B1 | 11/2010 | Belvin |
| 7,856,358 B2 | 12/2010 | Ho |
| 7,873,519 B2 | 1/2011 | Bennett |
| 7,873,523 B2 | 1/2011 | Potter |
| 7,873,654 B2 | 1/2011 | Bernard |

(56) References Cited

U.S. PATENT DOCUMENTS

| | | |
|---|---|---|
| 7,881,936 B2 | 2/2011 | Longe |
| 7,890,324 B2 | 2/2011 | Bangalore |
| 7,894,849 B2 | 2/2011 | Kass |
| 7,902,969 B2 | 3/2011 | Obradovich |
| 7,917,367 B2 | 3/2011 | DiCristo |
| 7,920,682 B2 | 4/2011 | Byrne |
| 7,949,529 B2 | 5/2011 | Weider |
| 7,949,537 B2 | 5/2011 | Walker |
| 7,953,732 B2 | 5/2011 | Frank |
| 7,974,875 B1 | 7/2011 | Quilici |
| 7,983,917 B2 | 7/2011 | Kennewick |
| 7,984,287 B2 | 7/2011 | Gopalakrishnan |
| 8,005,683 B2 | 8/2011 | Tessel |
| 8,015,006 B2 | 9/2011 | Kennewick |
| 8,024,186 B1 | 9/2011 | De Bonet |
| 8,027,965 B2 | 9/2011 | Takehara |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,078,625 B1* | 12/2011 | Zhang ............... G06F 17/30873 707/748 |
| 8,082,153 B2 | 12/2011 | Coffman |
| 8,086,463 B2 | 12/2011 | Ativanichayaphong |
| 8,103,510 B2 | 1/2012 | Sato |
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,195,468 B2 | 6/2012 | Weider |
| 8,200,485 B1 | 6/2012 | Lee |
| 8,204,751 B1 | 6/2012 | Di Fabbrizio |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,599 B2 | 12/2012 | Tomeh |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,340,975 B1 | 12/2012 | Rosenberger |
| 8,346,563 B1 | 1/2013 | Hjelm |
| 8,370,147 B2 | 2/2013 | Kennewick |
| 8,438,028 B2* | 5/2013 | Chengalvarayan ... G10L 15/063 704/239 |
| 8,447,607 B2 | 5/2013 | Weider |
| 8,447,651 B1 | 5/2013 | Scholl |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,577,671 B1* | 11/2013 | Barve ............... G06F 17/30522 370/352 |
| 8,589,161 B2 | 11/2013 | Kennewick |
| 8,612,205 B2 | 12/2013 | Hanneman |
| 8,612,206 B2 | 12/2013 | Chalabi |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2 | 9/2014 | Pansari |
| 8,849,791 B1 | 9/2014 | Hertschuh |
| 8,886,536 B2 | 11/2014 | Freeman |
| 8,972,243 B1 | 3/2015 | Strom |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,070,366 B1* | 6/2015 | Mathias ............... G06F 17/279 |
| 9,070,367 B1 | 6/2015 | Hoffmeister |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 9,308,445 B1 | 4/2016 | Merzenich |
| 9,406,078 B2 | 8/2016 | Freeman |
| 9,443,514 B1 | 9/2016 | Taubman |
| 9,502,025 B2 | 11/2016 | Kennewick |
| 2001/0039492 A1 | 11/2001 | Nemoto |
| 2001/0041980 A1 | 11/2001 | Howard |
| 2001/0047261 A1 | 11/2001 | Kassan |
| 2001/0049601 A1 | 12/2001 | Kroeker |
| 2001/0054087 A1 | 12/2001 | Flom |
| 2002/0002548 A1 | 1/2002 | Roundtree |
| 2002/0007267 A1 | 1/2002 | Batchilo |
| 2002/0010584 A1 | 1/2002 | Schultz |
| 2002/0015500 A1 | 2/2002 | Belt |
| 2002/0022927 A1 | 2/2002 | Lemelson |
| 2002/0022956 A1* | 2/2002 | Ukrainczyk ........ G06F 17/218 704/9 |
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1 | 6/2002 | Ikeda |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133347 A1 | 9/2002 | Schoneburg |
| 2002/0133354 A1 | 9/2002 | Ross |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |
| 2002/0152260 A1 | 10/2002 | Chen |
| 2002/0161646 A1 | 10/2002 | Gailey |
| 2002/0161647 A1 | 10/2002 | Gailey |
| 2002/0169597 A1 | 11/2002 | Fain |
| 2002/0173333 A1 | 11/2002 | Buchholz |
| 2002/0173961 A1 | 11/2002 | Guerra |
| 2002/0184373 A1 | 12/2002 | Maes |
| 2002/0188602 A1 | 12/2002 | Stubler |
| 2002/0198714 A1 | 12/2002 | Zhou |
| 2003/0005033 A1 | 1/2003 | Mohan |
| 2003/0014261 A1 | 1/2003 | Kageyama |
| 2003/0016835 A1 | 1/2003 | Elko |
| 2003/0036903 A1 | 2/2003 | Konopka |
| 2003/0046071 A1 | 3/2003 | Wyman |
| 2003/0046281 A1 | 3/2003 | Son |
| 2003/0046346 A1 | 3/2003 | Mumick |
| 2003/0064709 A1 | 4/2003 | Gailey |
| 2003/0065427 A1 | 4/2003 | Funk |
| 2003/0069734 A1 | 4/2003 | Everhart |
| 2003/0069880 A1 | 4/2003 | Harrison |
| 2003/0088421 A1 | 5/2003 | Maes |
| 2003/0093419 A1 | 5/2003 | Bangalore |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |

(56) References Cited

U.S. PATENT DOCUMENTS

| | | |
|---|---|---|
| 2003/0120493 A1 | 6/2003 | Gupta |
| 2003/0135488 A1 | 7/2003 | Amir |
| 2003/0144846 A1 | 7/2003 | Denenberg |
| 2003/0158731 A1 | 8/2003 | Falcon |
| 2003/0161448 A1 | 8/2003 | Parolkar |
| 2003/0167167 A1 | 9/2003 | Gong |
| 2003/0174155 A1 | 9/2003 | Weng |
| 2003/0182132 A1 | 9/2003 | Niemoeller |
| 2003/0187643 A1 | 10/2003 | VanThong |
| 2003/0204492 A1 | 10/2003 | Wolf |
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |
| 2003/0225825 A1 | 12/2003 | Healey |
| 2003/0233230 A1 | 12/2003 | Ammicht |
| 2003/0236664 A1 | 12/2003 | Sharma |
| 2004/0006475 A1 | 1/2004 | Ehlen |
| 2004/0010358 A1 | 1/2004 | Oesterling |
| 2004/0025115 A1 | 2/2004 | Sienel |
| 2004/0030741 A1 | 2/2004 | Wolton |
| 2004/0036601 A1 | 2/2004 | Obradovich |
| 2004/0044516 A1 | 3/2004 | Kennewick |
| 2004/0093567 A1 | 5/2004 | Schabes |
| 2004/0098245 A1 | 5/2004 | Walker |
| 2004/0117179 A1 | 6/2004 | Balasuriya |
| 2004/0117804 A1 | 6/2004 | Scahill |
| 2004/0122673 A1 | 6/2004 | Park |
| 2004/0122674 A1 | 6/2004 | Bangalore |
| 2004/0133793 A1 | 7/2004 | Ginter |
| 2004/0140989 A1 | 7/2004 | Papageorge |
| 2004/0143440 A1 | 7/2004 | Prasad |
| 2004/0148154 A1* | 7/2004 | Acero ............... G06F 17/2715 704/1 |
| 2004/0148170 A1* | 7/2004 | Acero ............... G06F 17/2715 704/257 |
| 2004/0158555 A1 | 8/2004 | Seedman |
| 2004/0166832 A1 | 8/2004 | Portman |
| 2004/0167771 A1 | 8/2004 | Duan |
| 2004/0172247 A1 | 9/2004 | Yoon |
| 2004/0172258 A1 | 9/2004 | Dominach |
| 2004/0189697 A1 | 9/2004 | Fukuoka |
| 2004/0193408 A1 | 9/2004 | Hunt |
| 2004/0193420 A1 | 9/2004 | Kennewick |
| 2004/0199375 A1 | 10/2004 | Ehsani |
| 2004/0199389 A1 | 10/2004 | Geiger |
| 2004/0201607 A1 | 10/2004 | Mulvey |
| 2004/0205671 A1 | 10/2004 | Sukehiro |
| 2004/0243393 A1 | 12/2004 | Wang |
| 2004/0243417 A9 | 12/2004 | Pitts |
| 2004/0247092 A1 | 12/2004 | Timmins |
| 2004/0249636 A1 | 12/2004 | Applebaum |
| 2005/0015256 A1 | 1/2005 | Kargman |
| 2005/0021331 A1 | 1/2005 | Huang |
| 2005/0021334 A1 | 1/2005 | Iwahashi |
| 2005/0021470 A1 | 1/2005 | Martin |
| 2005/0021826 A1 | 1/2005 | Kumar |
| 2005/0033574 A1 | 2/2005 | Kim |
| 2005/0033582 A1 | 2/2005 | Gadd |
| 2005/0043940 A1 | 2/2005 | Elder |
| 2005/0080632 A1 | 4/2005 | Endo |
| 2005/0102282 A1 | 5/2005 | Linden |
| 2005/0114116 A1 | 5/2005 | Fiedler |
| 2005/0125232 A1 | 6/2005 | Gadd |
| 2005/0131673 A1 | 6/2005 | Koizumi |
| 2005/0137850 A1 | 6/2005 | Odell |
| 2005/0137877 A1 | 6/2005 | Oesterling |
| 2005/0143994 A1 | 6/2005 | Mori |
| 2005/0144013 A1 | 6/2005 | Fujimoto |
| 2005/0144187 A1 | 6/2005 | Che |
| 2005/0149319 A1 | 7/2005 | Honda |
| 2005/0216254 A1 | 9/2005 | Gupta |
| 2005/0222763 A1 | 10/2005 | Uyeki |
| 2005/0234637 A1 | 10/2005 | Obradovich |
| 2005/0234727 A1 | 10/2005 | Chiu |
| 2005/0246174 A1 | 11/2005 | DeGolia |
| 2005/0283364 A1 | 12/2005 | Longe |
| 2005/0283532 A1 | 12/2005 | Kim |
| 2005/0283752 A1 | 12/2005 | Fruchter |
| 2006/0041431 A1 | 2/2006 | Maes |
| 2006/0046740 A1 | 3/2006 | Johnson |
| 2006/0047509 A1 | 3/2006 | Ding |
| 2006/0072738 A1 | 4/2006 | Louis |
| 2006/0074670 A1 | 4/2006 | Weng |
| 2006/0074671 A1 | 4/2006 | Farmaner |
| 2006/0080098 A1 | 4/2006 | Campbell |
| 2006/0100851 A1 | 5/2006 | Schonebeck |
| 2006/0106769 A1 | 5/2006 | Gibbs |
| 2006/0129409 A1 | 6/2006 | Mizutani |
| 2006/0130002 A1 | 6/2006 | Hirayama |
| 2006/0182085 A1 | 8/2006 | Sweeney |
| 2006/0206310 A1 | 9/2006 | Ravikumar |
| 2006/0217133 A1 | 9/2006 | Christenson |
| 2006/0236343 A1 | 10/2006 | Chang |
| 2006/0242017 A1 | 10/2006 | Libes |
| 2006/0253247 A1 | 11/2006 | de Silva |
| 2006/0253281 A1 | 11/2006 | Letzt |
| 2006/0285662 A1 | 12/2006 | Yin |
| 2007/0011159 A1 | 1/2007 | Hillis |
| 2007/0033005 A1* | 2/2007 | Cristo ............... G06F 17/279 704/9 |
| 2007/0033020 A1 | 2/2007 | Francois |
| 2007/0033526 A1 | 2/2007 | Thompson |
| 2007/0038436 A1 | 2/2007 | Cristo |
| 2007/0038445 A1 | 2/2007 | Helbing |
| 2007/0043569 A1 | 2/2007 | Potter |
| 2007/0043574 A1 | 2/2007 | Coffman |
| 2007/0043868 A1 | 2/2007 | Kumar |
| 2007/0050191 A1* | 3/2007 | Weider ............ G06F 17/30864 704/275 |
| 2007/0050279 A1 | 3/2007 | Huang |
| 2007/0055525 A1 | 3/2007 | Kennewick |
| 2007/0061067 A1 | 3/2007 | Zeinstra |
| 2007/0061735 A1 | 3/2007 | Hoffberg |
| 2007/0073544 A1 | 3/2007 | Millett |
| 2007/0078708 A1 | 4/2007 | Yu |
| 2007/0078709 A1 | 4/2007 | Rajaram |
| 2007/0078814 A1 | 4/2007 | Flowers |
| 2007/0094003 A1 | 4/2007 | Huang |
| 2007/0100797 A1 | 5/2007 | Thun |
| 2007/0112555 A1 | 5/2007 | Lavi |
| 2007/0112630 A1 | 5/2007 | Lau |
| 2007/0118357 A1 | 5/2007 | Kasravi |
| 2007/0124057 A1 | 5/2007 | Prieto |
| 2007/0135101 A1 | 6/2007 | Ramati |
| 2007/0146833 A1 | 6/2007 | Satomi |
| 2007/0162296 A1 | 7/2007 | Altberg |
| 2007/0174258 A1 | 7/2007 | Jones |
| 2007/0179778 A1 | 8/2007 | Gong |
| 2007/0185859 A1 | 8/2007 | Flowers |
| 2007/0186165 A1 | 8/2007 | Maislos |
| 2007/0192309 A1 | 8/2007 | Fischer |
| 2007/0198267 A1 | 8/2007 | Jones |
| 2007/0203699 A1 | 8/2007 | Nagashima |
| 2007/0203736 A1 | 8/2007 | Ashton |
| 2007/0208732 A1 | 9/2007 | Flowers |
| 2007/0214182 A1 | 9/2007 | Rosenberg |
| 2007/0250901 A1 | 10/2007 | McIntire |
| 2007/0265850 A1 | 11/2007 | Kennewick |
| 2007/0266257 A1 | 11/2007 | Camaisa |
| 2007/0276651 A1 | 11/2007 | Bliss |
| 2007/0294615 A1 | 12/2007 | Sathe |
| 2007/0299824 A1 | 12/2007 | Pan |
| 2008/0014908 A1 | 1/2008 | Vasant |
| 2008/0034032 A1 | 2/2008 | Healey |
| 2008/0046311 A1 | 2/2008 | Shahine |
| 2008/0059188 A1 | 3/2008 | Konopka |
| 2008/0065386 A1 | 3/2008 | Cross |
| 2008/0065389 A1 | 3/2008 | Cross |
| 2008/0065390 A1 | 3/2008 | Ativanichayaphong |
| 2008/0086455 A1 | 4/2008 | Meisels |
| 2008/0091406 A1 | 4/2008 | Baldwin |
| 2008/0103761 A1 | 5/2008 | Printz |
| 2008/0103781 A1 | 5/2008 | Wasson |

(56) References Cited

U.S. PATENT DOCUMENTS

| | | |
|---|---|---|
| 2008/0104071 A1 | 5/2008 | Pragada |
| 2008/0109285 A1 | 5/2008 | Reuther |
| 2008/0115163 A1 | 5/2008 | Gilboa |
| 2008/0126091 A1* | 5/2008 | Clark ................. G10L 15/22 |
| | | 704/246 |
| 2008/0133215 A1 | 6/2008 | Sarukkai |
| 2008/0140385 A1 | 6/2008 | Mahajan |
| 2008/0147396 A1 | 6/2008 | Wang |
| 2008/0147410 A1 | 6/2008 | Odinak |
| 2008/0147637 A1 | 6/2008 | Li |
| 2008/0154604 A1 | 6/2008 | Sathish |
| 2008/0162471 A1 | 7/2008 | Bernard |
| 2008/0177530 A1 | 7/2008 | Cross |
| 2008/0184164 A1 | 7/2008 | Di Fabbrizio |
| 2008/0189110 A1 | 8/2008 | Freeman |
| 2008/0228496 A1 | 9/2008 | Yu |
| 2008/0235023 A1 | 9/2008 | Kennewick |
| 2008/0235027 A1 | 9/2008 | Cross |
| 2008/0269958 A1 | 10/2008 | Filev |
| 2008/0270135 A1* | 10/2008 | Goel .................. G10L 15/1822 |
| | | 704/257 |
| 2008/0270224 A1 | 10/2008 | Portman |
| 2008/0294437 A1 | 11/2008 | Nakano |
| 2008/0294994 A1 | 11/2008 | Kruger |
| 2008/0306743 A1 | 12/2008 | Di Fabbrizio |
| 2008/0319751 A1 | 12/2008 | Kennewick |
| 2009/0006077 A1 | 1/2009 | Keaveney |
| 2009/0006194 A1 | 1/2009 | Sridharan |
| 2009/0018829 A1 | 1/2009 | Kuperstein |
| 2009/0024476 A1 | 1/2009 | Baar |
| 2009/0030686 A1* | 1/2009 | Weng ................ G10L 15/1822 |
| | | 704/240 |
| 2009/0052635 A1 | 2/2009 | Jones |
| 2009/0055176 A1* | 2/2009 | Hu ..................... G10L 15/08 |
| | | 704/240 |
| 2009/0067599 A1 | 3/2009 | Agarwal |
| 2009/0076827 A1 | 3/2009 | Bulitta |
| 2009/0106029 A1 | 4/2009 | DeLine |
| 2009/0117885 A1 | 5/2009 | Roth |
| 2009/0144131 A1 | 6/2009 | Chiu |
| 2009/0144271 A1 | 6/2009 | Richardson |
| 2009/0150156 A1* | 6/2009 | Kennewick ........ G06Q 30/0261 |
| | | 704/257 |
| 2009/0157382 A1* | 6/2009 | Bar .................... G06F 17/2765 |
| | | 704/8 |
| 2009/0164216 A1 | 6/2009 | Chengalvarayan |
| 2009/0171664 A1 | 7/2009 | Kennewick |
| 2009/0171912 A1 | 7/2009 | Nash |
| 2009/0197582 A1 | 8/2009 | Lewis |
| 2009/0216540 A1 | 8/2009 | Tessel |
| 2009/0248565 A1 | 10/2009 | Chuang |
| 2009/0248605 A1 | 10/2009 | Mitchell |
| 2009/0259561 A1 | 10/2009 | Boys |
| 2009/0259646 A1 | 10/2009 | Fujita |
| 2009/0265163 A1 | 10/2009 | Li |
| 2009/0271194 A1 | 10/2009 | Davis |
| 2009/0273563 A1 | 11/2009 | Pryor |
| 2009/0276700 A1 | 11/2009 | Anderson |
| 2009/0287680 A1 | 11/2009 | Paek |
| 2009/0299745 A1 | 12/2009 | Kennewick |
| 2009/0299857 A1 | 12/2009 | Brubaker |
| 2009/0304161 A1 | 12/2009 | Pettyjohn |
| 2009/0307031 A1 | 12/2009 | Winkler |
| 2009/0313026 A1 | 12/2009 | Coffman |
| 2009/0319517 A1 | 12/2009 | Guha |
| 2010/0023320 A1 | 1/2010 | Cristo |
| 2010/0023331 A1* | 1/2010 | Duta .................. G10L 15/063 |
| | | 704/257 |
| 2010/0029261 A1 | 2/2010 | Mikkelsen |
| 2010/0036967 A1 | 2/2010 | Caine |
| 2010/0049501 A1 | 2/2010 | Kennewick |
| 2010/0049514 A1 | 2/2010 | Kennewick |
| 2010/0057443 A1 | 3/2010 | Cristo |
| 2010/0063880 A1 | 3/2010 | Atsmon |
| 2010/0064025 A1 | 3/2010 | Nelimarkka |
| 2010/0094707 A1 | 4/2010 | Freer |
| 2010/0138300 A1 | 6/2010 | Wallis |
| 2010/0145700 A1 | 6/2010 | Kennewick |
| 2010/0185512 A1 | 7/2010 | Borger |
| 2010/0204986 A1 | 8/2010 | Kennewick |
| 2010/0204994 A1 | 8/2010 | Kennewick |
| 2010/0217604 A1 | 8/2010 | Baldwin |
| 2010/0268536 A1* | 10/2010 | Suendermann ....... G10L 15/063 |
| | | 704/243 |
| 2010/0286985 A1 | 11/2010 | Kennewick |
| 2010/0299142 A1 | 11/2010 | Freeman |
| 2010/0299336 A1* | 11/2010 | Bergstraesser .... G06F 17/30864 |
| | | 707/759 |
| 2010/0312566 A1 | 12/2010 | Odinak |
| 2010/0318357 A1 | 12/2010 | Istvan |
| 2010/0331064 A1 | 12/2010 | Michelstein |
| 2011/0022393 A1 | 1/2011 | Waller |
| 2011/0106527 A1 | 5/2011 | Chiu |
| 2011/0112827 A1 | 5/2011 | Kennewick |
| 2011/0112921 A1 | 5/2011 | Kennewick |
| 2011/0119049 A1 | 5/2011 | Ylonen |
| 2011/0131036 A1 | 6/2011 | DiCristo |
| 2011/0131045 A1 | 6/2011 | Cristo |
| 2011/0231182 A1 | 9/2011 | Weider |
| 2011/0231188 A1 | 9/2011 | Kennewick |
| 2011/0238409 A1 | 9/2011 | Larcheveque |
| 2011/0307167 A1 | 12/2011 | Taschereau |
| 2012/0022857 A1 | 1/2012 | Baldwin |
| 2012/0041753 A1 | 2/2012 | Dymetman |
| 2012/0046935 A1 | 2/2012 | Nagao |
| 2012/0101809 A1 | 4/2012 | Kennewick |
| 2012/0101810 A1 | 4/2012 | Kennewick |
| 2012/0109753 A1 | 5/2012 | Kennewick |
| 2012/0150620 A1 | 6/2012 | Mandyam |
| 2012/0150636 A1 | 6/2012 | Freeman |
| 2012/0166183 A1* | 6/2012 | Suendermann ....... G06F 17/289 |
| | | 704/9 |
| 2012/0239498 A1 | 9/2012 | Ramer |
| 2012/0240060 A1 | 9/2012 | Pennington |
| 2012/0265528 A1 | 10/2012 | Gruber |
| 2012/0278073 A1 | 11/2012 | Weider |
| 2013/0006734 A1 | 1/2013 | Ocko |
| 2013/0054228 A1 | 2/2013 | Baldwin |
| 2013/0060625 A1 | 3/2013 | Davis |
| 2013/0080177 A1 | 3/2013 | Chen |
| 2013/0211710 A1 | 8/2013 | Kennewick |
| 2013/0253929 A1 | 9/2013 | Weider |
| 2013/0254314 A1 | 9/2013 | Chow |
| 2013/0297293 A1 | 11/2013 | Cristo |
| 2013/0304473 A1 | 11/2013 | Baldwin |
| 2013/0311324 A1 | 11/2013 | Stoll |
| 2013/0332454 A1* | 12/2013 | Stuhec ................ G06F 17/3053 |
| | | 707/730 |
| 2013/0339022 A1 | 12/2013 | Baldwin |
| 2014/0006951 A1 | 1/2014 | Hunter |
| 2014/0012577 A1 | 1/2014 | Freeman |
| 2014/0025371 A1 | 1/2014 | Min |
| 2014/0108013 A1 | 4/2014 | Cristo |
| 2014/0156278 A1 | 6/2014 | Kennewick |
| 2014/0195238 A1 | 7/2014 | Terao |
| 2014/0236575 A1 | 8/2014 | Tur |
| 2014/0249821 A1 | 9/2014 | Kennewick |
| 2014/0249822 A1 | 9/2014 | Baldwin |
| 2014/0278413 A1 | 9/2014 | Pitschel |
| 2014/0278416 A1 | 9/2014 | Schuster |
| 2014/0288934 A1 | 9/2014 | Kennewick |
| 2014/0330552 A1 | 11/2014 | Bangalore |
| 2014/0365222 A1 | 12/2014 | Weider |
| 2015/0019211 A1* | 1/2015 | Simard ................ G06F 17/2785 |
| | | 704/10 |
| 2015/0019217 A1 | 1/2015 | Cristo |
| 2015/0019227 A1 | 1/2015 | Anandarajah |
| 2015/0066479 A1 | 3/2015 | Pasupalak |
| 2015/0066627 A1 | 3/2015 | Freeman |
| 2015/0073910 A1 | 3/2015 | Kennewick |
| 2015/0095159 A1 | 4/2015 | Kennewick |
| 2015/0142447 A1 | 5/2015 | Kennewick |
| 2015/0170641 A1 | 6/2015 | Kennewick |

(56) References Cited

U.S. PATENT DOCUMENTS

| | | | |
|---|---|---|---|
| 2015/0193379 A1* | 7/2015 | Mehta | G10L 15/00 704/9 |
| 2015/0199339 A1 | 7/2015 | Mirkin | |
| 2015/0228276 A1 | 8/2015 | Baldwin | |
| 2015/0293917 A1* | 10/2015 | Bufe, III | G06F 17/30867 706/12 |
| 2015/0348544 A1 | 12/2015 | Baldwin | |
| 2015/0348551 A1* | 12/2015 | Gruber | G06F 17/2705 704/235 |
| 2015/0364133 A1 | 12/2015 | Freeman | |
| 2016/0049152 A1 | 2/2016 | Kennewick | |
| 2016/0078482 A1 | 3/2016 | Kennewick | |
| 2016/0078491 A1 | 3/2016 | Kennewick | |
| 2016/0078504 A1 | 3/2016 | Kennewick | |
| 2016/0078773 A1 | 3/2016 | Carter | |
| 2016/0110347 A1 | 4/2016 | Kennewick | |
| 2016/0110478 A1* | 4/2016 | Aggour | G06F 17/30994 707/755 |
| 2016/0148610 A1 | 5/2016 | Kennewick | |
| 2016/0188292 A1 | 6/2016 | Carter | |
| 2016/0188573 A1 | 6/2016 | Tang | |
| 2016/0217785 A1 | 7/2016 | Kennewick | |
| 2016/0335676 A1 | 11/2016 | Freeman | |
| 2017/0242843 A1* | 8/2017 | Jiao | G06F 9/46 |

FOREIGN PATENT DOCUMENTS

| | | |
|---|---|---|
| EP | 1320043 A2 | 6/2003 |
| EP | 1646037 | 4/2006 |
| JP | H08263258 | 10/1996 |
| JP | H11249773 | 9/1999 |
| JP | 2001071289 | 3/2001 |
| JP | 2006146881 | 6/2006 |
| JP | 2008027454 | 2/2008 |
| JP | 2008058465 | 3/2008 |
| JP | 2008139928 | 6/2008 |
| JP | 2011504304 | 2/2011 |
| JP | 2012518847 | 8/2012 |
| WO | 9946763 | 9/1999 |
| WO | 0021232 | 1/2000 |
| WO | 0046792 | 1/2000 |
| WO | 0171609 A2 | 9/2001 |
| WO | 0178065 | 10/2001 |
| WO | 2004072954 | 1/2004 |
| WO | 2005010702 A2 | 2/2005 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2009075912 | 1/2009 |
| WO | 2009145796 | 1/2009 |
| WO | 2009111721 | 9/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

Gabrilovich, Evgeniy, and Shaul Markovitch. "Computing semantic relatedness using wikipedia-based explicit semantic analysis." IJcAI. vol. 7. 2007.*

"Statement in Accordance with the Notice from the European Patent Office" dated Oct. 1, 2007 Concerning Business Methods (OJ EPO Nov. 2007, 592-593), XP002456252.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", Proceedings of the IEEE International Conference on Acoustics, Speech, and Signal Processing, vol. 3, Jun. 5-9, 2000, XP010507574, pp. 1257-1260.

Belvin, Robert, et al., "Development of the HRL Route Navigation Dialogue System", Proceedings of the First International Conference on Human Language Technology Research, San Diego, 2001, pp. 1-5.

Chai et al., "MIND: A Semantics-Based Multimodal Interpretation Framework for Conversational Systems", Proceedings of the International Class Workshop on Natural, Intelligent and Effective Interaction in Multimodal Dialogue Systems, Jun. 2002, pp. 37-46.

Cheyer et al., "Multimodal Maps: An Agent-Based Approach", International Conference on Cooperative Multimodal Communication (CMC/95), May 24-26, 1995, pp. 111-121.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Elio et al., "On Abstract Task Models and Conversation Policies" in Workshop on Specifying and Implementing Conversation Policies, Autonomous Agents '99, Seattle, 1999, 10 pages.

Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.

Kuhn, Thomas, et al., "Hybrid In-Car Speech Recognition for Mobile Multimedia Applications", Vehicular Technology Conference, IEEE, Jul. 1999, pp. 2009-2013.

Lin, Bor-shen, et al., "A Distributed Architecture for Cooperative Spoken Dialogue Agents with Coherent Dialogue State and History", ASRU'99, 1999, 4 pages.

Lind, R., et al., The Network Vehicle—A Glimpse into the Future of Mobile Multi-Media, IEEE Aerosp. Electron. Systems Magazine, vol. 14, No. 9, Sep. 1999, pp. 27-32.

Mao, Mark Z., "Automatic Training Set Segmentation for Multi-Pass Speech Recognition", Department of Electrical Engineering, Stanford University, CA, copyright 2005, IEEE, pp. I-685 to I-688.

O'Shaughnessy, Douglas, "Interacting with Computers by Voice: Automatic Speech Recognition and Synthesis", Proceedings of the IEEE, vol. 91, No. 9, Sep. 1, 2003, XP011100665. pp. 1272-1305.

Reuters, "IBM to Enable Honda Drivers to Talk to Cars", Charles Schwab & Co., Inc., Jul. 28, 2002, 1 page.

Turunen, "Adaptive Interaction Methods in Speech User Interfaces", Conference on Human Factors in Computing Systems, Seattle, Washington, 2001, pp. 91-92.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2, IEEE, 1998, 4 pages.

Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.

Zhao, Yilin, "Telematics: Safe and Fun Driving", IEEE Intelligent Systems, vol. 17, Issue 1, 2002, pp. 10-14.

Davis, Z., et al., A Personal Handheld Multi-Modal Shopping Assistant, IEEE, 2006, 9 pages.

* cited by examiner

SYSTEM AND METHOD OF DETERMINING A DOMAIN AND/OR AN ACTION RELATED TO A NATURAL LANGUAGE INPUT

CROSS REFERENCE TO RELATED APPLICATION

This application claims the benefit of U.S. Provisional Patent Application Ser. No. 62/085,029 filed Nov. 26, 2014 entitled "System and Method of Determining a Domain and/or an Action Related to a Natural Language Input," the entirety of which is incorporated herein by reference.

FIELD OF THE INVENTION

The invention relates to providing natural language processing, such as determining an information domain associated with a natural language input, confirming whether the domain is correctly determined or identified, and/or determining an action responsive to the natural language input.

BACKGROUND OF THE INVENTION

Generally, in the context of natural language processing or understanding, before a specific action is performed in response to a natural language (NL) input, an information domain (from a plurality of pre-configured information domains) to which the NL input belongs is identified or determined (with a particular likelihood). By classifying an NL input to a particular domain, a natural language understanding (NLU) system may extract possible intent of the NL input, and identify or determine specific computer-executable actions related to that information domain, which, when executed, are responsive to the intended request in the NL input.

However, based on the complexity of the NL input and capabilities of (e.g., scope of the grammar configured for) the NLU system, the domain for the NL input may not be correctly determined. This may result in incorrect or unintended actions being executed in response to the NL input, resulting in an inefficient and unsatisfactory user experience. These and other drawbacks exist.

SUMMARY OF THE INVENTION

An NLU system may parse a received NL user input into one or more tokens according to a lexicon and a semantic grammar, and based on the tokens, may classify the NL input into one or more of many pre-configured information domains or classes (referred herein interchangeably as "information domains" or "domains"). The pre-configured domains may be defined as part of or related to the semantic grammar of the NLU system. These domains may be "action-centric," i.e., each domain may represent a specific type of (computer-executable) task or action performed for a given NL input (e.g., "call," "map," "shop," "play," "record," "online search," domains, etc.). For example, NL inputs "call John Doe" and "dial John Doe's number" both may be classified as belonging to the "call" domain. Additionally, or alternatively, the pre-configured domains may be "entity-centric," i.e., each domain may represent a specific type of entity or subject mentioned in a given NL input (e.g., "song," "business," "person," etc.) for which a certain task or action is to be performed responsive to the NL input. For example, NL inputs "search John Doe's address" and "dial John Doe's number" both may be classified as belonging to the "person" domain based on recognizing "John Doe" as a person's name in the NL inputs. Accordingly, by classifying an NL input to one or more specific domains (from the action-centric and/or entity-centric domains), the NLU system may understand possible intent of the NL input, and identify or determine specific computer-executable actions related to those information domains, which, when executed, are responsive to the intended request in the NL input.

The present disclosure relates to methods, systems and other embodiments directed to determining an information domain match for a natural language (NL) input (e.g., a spoken utterance), and confirming whether the NL input is correctly matched to the determined information domain. For example, after receiving an NL input, based on a semantic pattern matching technique, the system may determine a first information domain to which the NL input belongs and a feature value set. Further, the system may determine a second information domain to which the NL input belongs, and a corresponding confidence score related to the second information domain. The second information domain may be determined based on a first statistical classification technique. Based on the determined feature value set and the confidence score related to the second information domain, the system may confirm whether the NL input correctly belongs to the first information domain, e.g., based on a second statistical classification technique.

In an implementation, the NL input is represented using one or more tokens. In this implementation, for example, to determine the first domain and the feature value set based the semantic pattern matching technique, the system may match the one or more tokens to one or more computer-executable tasks and one or more entities, based at least on a sematic grammar. The semantic grammar may be specific to the semantic pattern matching technique and may include pre-configured rules based on which an NL input (or tokens thereof) may be structured, parsed and/or understood. The one or more tasks and the one or more entities may also be a part of the semantic grammar associated with the semantic pattern matching technique.

The feature value set for the NL input generated from the semantic pattern matching may include one or more of the following: a total number of the one or more tokens matched, a fraction number of the one or more tokens matched, a matching score assigned to at least one of the one or more tokens, and a matching score assigned to the NL input.

In an implementation, the system may determine the second information domain to which the NL input belongs based on a first statistical classification technique (e.g., using a maximum-entropy classifier). To that end, the system may generate an input feature vector for the NL input, wherein each element of the input feature vector represents at least one of the one or more tokens of the NL input. The system may process such an input feature vector in accordance with the statistical classification technique to determine the second information domain and the confidence score.

In an implementation, the system may determine whether the NL input correctly belongs to the first information domain based on another statistical classification technique. For example, the system may process the feature value set (from the semantic pattern matching) and the confidence score (from the first statistical classifier) based on a second statistical classification technique. As part of such processing, the system may obtain coefficient weights associated with the second statistical classification technique for the feature value set and the confidence score, and process the feature value set and the confidence score with the coefficient weights to determine a confirmation score related to the first information domain. The system may compare the confirmation score related to the first information domain with a certain (pre-defined) threshold, and based a result of the comparison, the system may determine whether the NL input correctly belongs to the first information domain. Once the system confirms that the NL input has been correctly classified to the first information domain, the system identifies/determines and performs a specific computer-executable action from that information domain to complete the query or command mentioned in the NL input.

The techniques described herein may be applied to a wide range of natural language applications that use natural language input from a user. For example, and without limitation, applications of various methods and systems discussed herein may include natural language interfaces to computing systems, communication with robots in natural language, personalized digital assistants, question-answer query systems, and/or other natural language processing or understanding applications.

Various other aspects of the invention will be apparent through the detailed description below and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Figure 1:
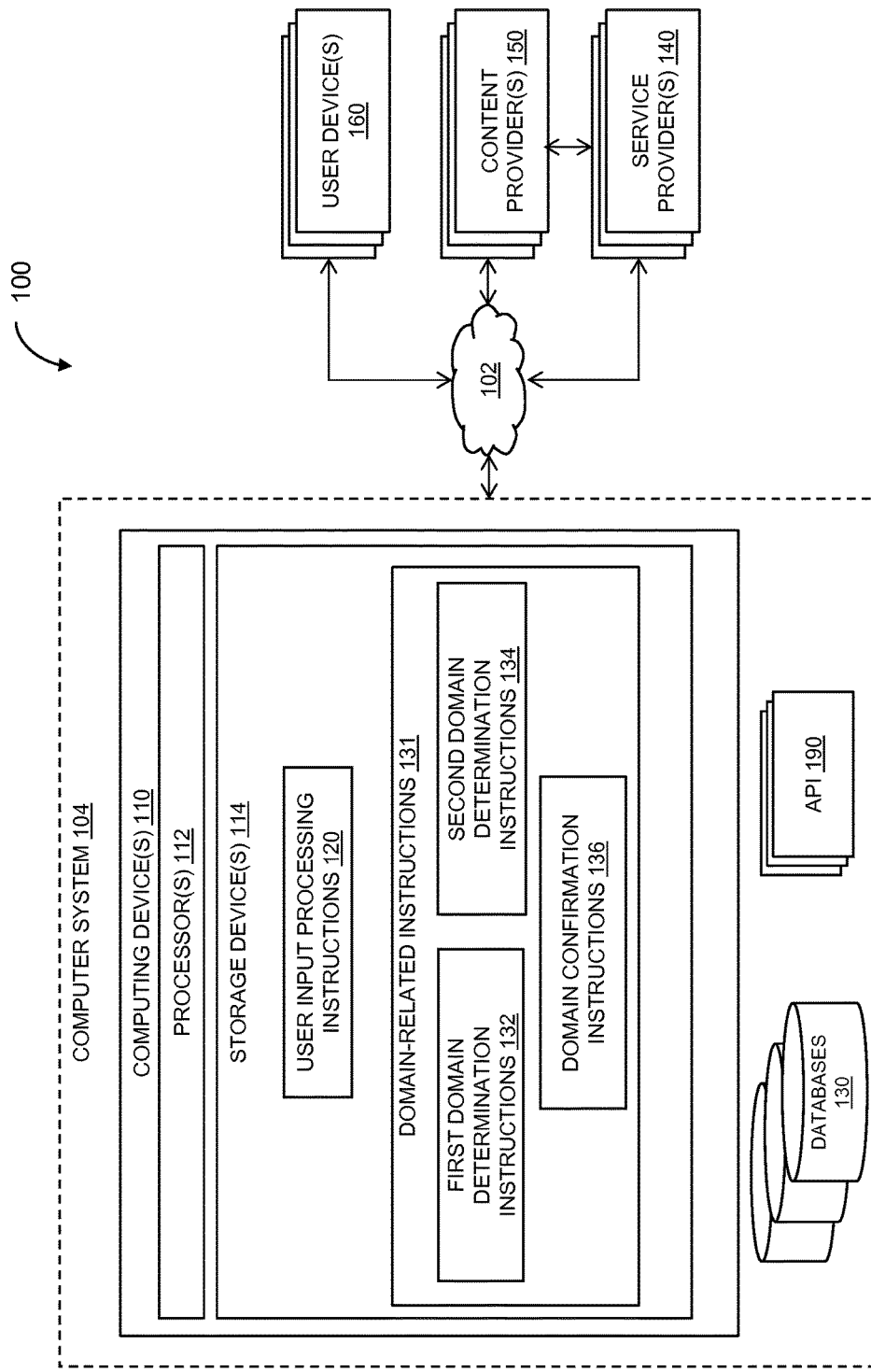
FIG. 1 illustrates a system to provide natural language processing, according to an implementation of the present disclosure.

FIG. 1 illustrates a system 100 to confirm whether a domain match determined for a natural language input is correct, according to an implementation of the invention. In an implementation, system 100 may determine an information domain (from among a plurality of pre-configured domains) to which a natural language (NL) input belongs. System 100 may then confirm whether the NL input is correctly matched to the determined information domain. Based on the specific natural language processing (NLP) or natural language understanding (NLU) techniques employed within system 100, determining the correct domain(s) to which the NL input belongs facilitates system 100 to accurately extract or understand intent of (or a nature of the request indicated in) the NL input. Based on that understanding, system 100 may identify or determine specific computer-executable actions related to those domain(s), which, when executed, are responsive to the intended request in the NL input.

As an example, system 100 may include a NLU system based on a semantic pattern matching technique (or a rules-based NLU (RNLU) technique). Such RNLU system may parse a received NL user input into one or more tokens according to a lexicon and a semantic grammar, and based on the tokens, may classify the NL input into one or more of many pre-configured domains or classes. The pre-configured domains may be defined as part of or related to the semantic grammar of the RNLU system. These domains may be "action-centric," i.e., each domain may represent a specific type of (computer-executable) task or action performed for a given NL input (e.g., "call," "map," "shop," "play," "record," "online search," domains, etc.). Additionally, or alternatively, the pre-configured domains may be "entity-centric," i.e., each domain may represent a specific type of entity or subject mentioned in a given NL input (e.g., "song," "business," "person," etc.) for which a certain task or action is to be performed responsive to the NL input.

As one example, system 100 may receive a spoken NL utterance input "send a text to Larry saying "I cannot call John tomorrow"." The domains defined for the RNLU system may or may not include a domain for the action "send text" (or any other texting-related domains). However, based on criteria defined by the sematic grammar of the RNLU system (e.g., assigning the highest priority to the word "call"), the RNLU system may resolve that the NL input includes a token "call John," and as such, the NL input belongs to the "call" domain, indicating that the user intends to (immediately) place a phone call to a contact named "John." Accordingly, based on the erroneous assignment of the NL input to the "call" domain, system 100 may identify and/or execute an unintended or erroneous action (e.g., initiating a phone call to "John"), resulting in an inefficient and unsatisfactory user experience. In an implementation, the RNLU system also provides one or more features related to the processing of the NL input to determine its domain.

Such features may include, but not limited to, a total number of the one or more tokens matched, a fraction number of the one or more tokens matched, a matching score assigned to at least one of the one or more tokens, and a matching score assigned to the NL input.

To ensure that the NL input is correctly assigned to an intended domain (and a correct and appropriate computer-executable action is determined), system 100 may employ another NLU system, e.g., a statistical classification-based NLU (SNLU) system, configured therewithin. The SNLU system may receive the same NL utterance input as the RNLU system, and process the NL input to generate an input feature vector. Each element of the input feature vector may represent at least one of the one or more tokens of the NL input. The SNLU system may process such an input feature vector in accordance with the statistical classification technique configured therein (e.g., a maximum-entropy classification technique) to determine one or more domains to which the NL input possibly belongs. The SNLU system may also generate one or more confidence scores (e.g., probability values) corresponding to the one or more determined domains, the confidence scores indicating the likelihood of the NL input belonging to the respective domains. For example, for the NL input "send a text to Larry saying "I cannot call John tomorrow"," the SNLU system, based on the statistical classification technique thereof, may determine that the NL input belongs to (a) "send text" domain with a confidence score equal to 0.5 (out of 1), (b) "call" domain with a confidence score equal to 0.4, and (c) "set reminder" domain with a confidence score equal to 0.1.

In an implementation, system 100 may utilize and process the output of the RNLU system (e.g., the feature set) and the output of the SNLU system (e.g., the domain confidence scores) to ascertain whether the NL input correctly belongs to the domain determined by the RNLU system. For example, system 100 may include a domain-confirm system including a statistical classifier (e.g., based on a logistic classifier) that takes the feature value set from the RNLU system and the confidence scores from the SNLU system as its input, and generate a confirmation score related to the domain determined by the RNLU system. System 100 may compare the confirmation score with a certain (pre-defined) threshold, and based a result of the comparison, determines whether the NL input correctly belongs to the domain determined by the RNLU system.

For example, with regard to the foregoing example, the domain-confirm system, based on the parameters provided by the SNLU and RNLU systems, may calculate a confirmation score of 0.3 for the "call" domain determined by the RNLU system. Comparing with a fixed threshold equal to 0.5, system 100 may determine that, since the confirmation score (0.3) of the "call" domain is lower than the threshold (0.5), the NL input does not belong to the "call" domain. In other words, the result of the threshold comparison indicates that the output of the RNLU system that user utterance belongs to the "call" domain is erroneous. Accordingly, system 100 may not advance the processing of the NL input, e.g., system 100 may not prepare for or execute an action (e.g., initiating a phone call) responsive to the NL input.

In this case, system 100 may output a message to the user indicating that system 100 is not configured to complete the request indicated in the NL input and/or requesting another NL input from the user. Alternatively, system 100 may request the RNLU system to consider another domain for the original NL input (e.g., a domain that the RNLU system may have determined as less likely than the previously-determined domain) and provide new features for the other domain to the domain-confirm classifier. The domain-confirm classifier may process the new features along with the (previously-computed) confidence scores from the SNLU system to determine whether the NL input belongs to the other domain (based on the threshold comparison discussed above).

However, based on the confirmation score from the domain-confirm system, if system 100 confirms that the NL input has been correctly classified to the domain determined by the RNLU system, system 100 (or the RNLU system) identifies and performs a specific computer-executable action pre-defined for that domain to responsive to the NL input. For example, if the NL input was indeed "call John," and it is confirmed that the RNLU system correctly identified the NL input as belonging to the "call" domain, system 100 may perform one or more computer-executable tasks to complete the user request. For example, system 100 may extract a phone number for the contact "John" from the contact information stored at a user's device, and initiate a phone call to the phone number from the user's device.

Other uses of system 100 are described herein and still others will be apparent to those having skill in the art. Having described a high level overview of some of the system functions, attention will now be turned to various system components that facilitate these and other functions.

System Components

Computer system 104 may interface with service provider(s) 140 to allow users access to services offered by service provider(s) 140, interface with content provider(s) 150 to allow users to access content offered by content provider(s) 150, and provide various interfaces to user device(s) 160 so that users may interact with computer system 104.

To facilitate these and other functions, computer system 104 may include one or more computing devices 110. Each computing device 110 may include one or more processors 112, one or more storage devices 114, one or more databases 130, one or more APIs 190 (e.g., to interface with service provider(s) 140, content provider(s) 150, user device(s) 160, etc.), and/or other components.

Processor(s) 112 may be programmed with one or more computer program instructions, which may be stored in storage device(s) 114, to perform one or more operations. The one or more computer program instructions may comprise user input processing instructions 120, domain-related instructions 131, first domain-determination instructions 132, second domain-determination instructions 134, domain-confirmation instructions 136, and/or other instructions.

In some implementations, a given user device 160 may comprise a given computer device 110. As such, the given user device 160 may comprise processor(s) 112 that are programmed with one or more computer program instructions, such as user input processing instructions 120, domain-related instructions 131, and/or other instructions. Domain-related instructions 131 may be part of user input processing instructions 120, and/or may further include first domain-determination instructions 132, second domain-determination instructions 134, domain-confirmation instructions 136, and/or other instructions.

As used hereinafter, for convenience, the foregoing instructions will be described as performing one or more operations, when, in fact, the various instructions may program processor(s) 112 (and thereafter computer system 104) to perform the operation(s).

User Input Processing Including Natural Language Processing/Understanding

In an implementation, user input processing instructions 120 may process one or more user inputs of a user to determine one or more user requests (e.g., queries or commands) that are intended by the user when the user provided the user inputs. The user inputs may comprise an auditory input (e.g., received via a microphone), a visual input (e.g., received via a camera), a tactile input (e.g., received via a touch sensor device), an olfactory input, a gustatory input, a keyboard input, a mouse input, or other user input. As described elsewhere herein, user input processing instructions 120 and/or domain-related instructions 131 may comprise instructions associated with one or more speech recognition engines (e.g., speech recognition engine(s) 220 of FIG. 2), one or more natural language processing (NLP)/natural language understanding (NLU) engines (e.g., NLP/NLU engine(s) 230 of FIG. 2), or other components for processing user inputs to determine user requests related to the user inputs.

In one use case, if the user input is a natural language utterance spoken by a user, the natural language utterance may be processed by a speech recognition engine to recognize one or more words of the natural language utterance. The recognized words may then be processed, along with context information associated with the user, by a NLP/NLU engine to determine and/or confirm a user request intended by the user when the user provided the natural language utterance. An example of the processing of the user request may include predicting one or more information domains that the user request may belong to (e.g., indicating a type of action needed to complete the request and/or a type of entity mentioned in the request), assigning a confidence score to each of the potential domains, selecting the domain with the highest confidence score as the domain to the user request belongs, determining or confirming whether the selected domain is the correct domain to which the user request should be assigned or classified, and if so, selecting an action or task related to the selected (and confirmed) domain to respond to the intended user request.

Figure 2:
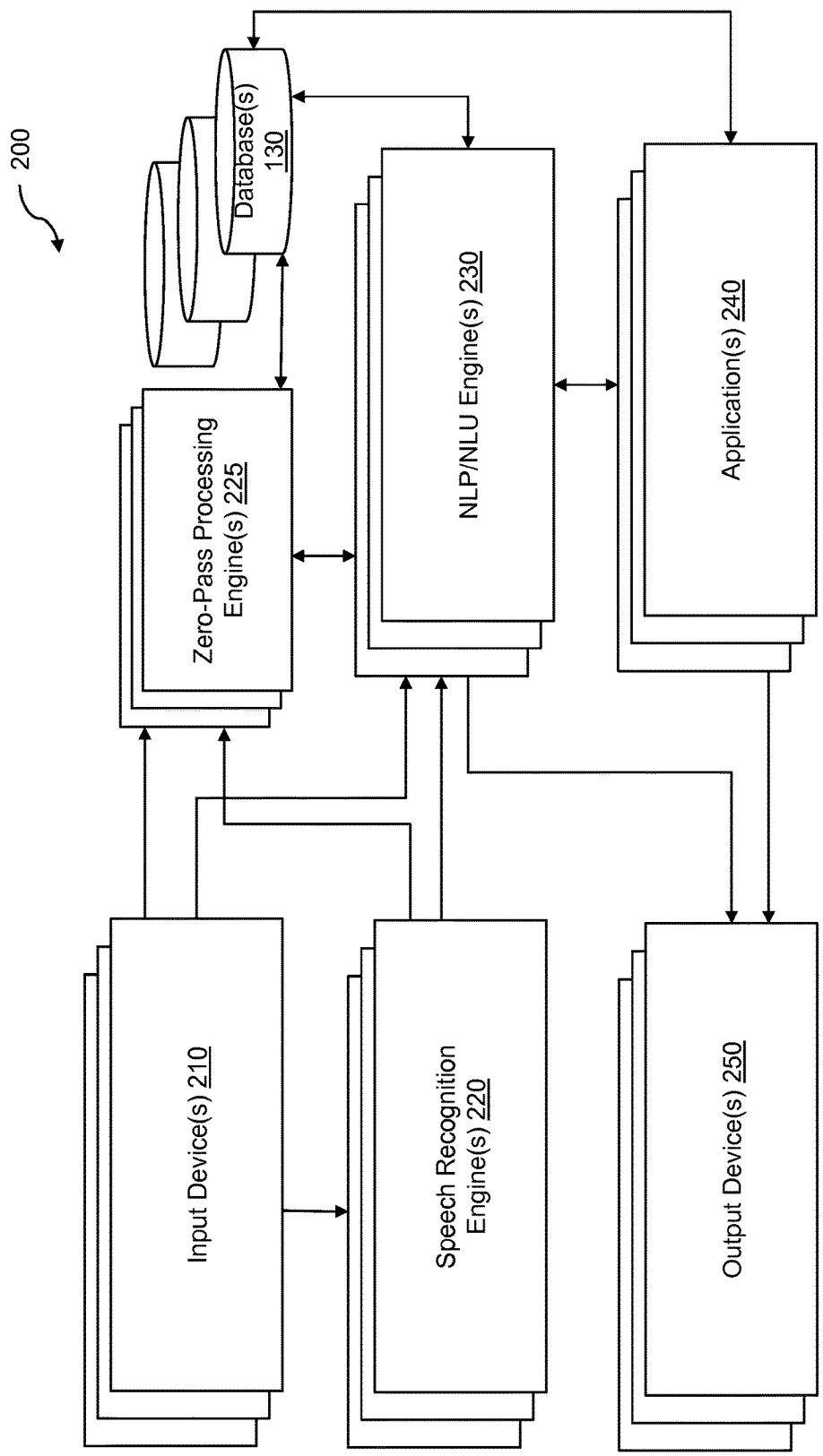
FIG. 2 illustrates a system to facilitate processing including natural language processing of a natural language input, according to an implementation of the present disclosure.

FIG. 2 illustrates a system 200 for facilitating natural language processing/understanding, according to an implementation of the present disclosure. As shown in FIG. 2, system 200 may comprise input device(s) 210, speech recognition engine(s) 220, zero-pass processing engine 225, NLP/NLU engine(s) 230, application(s) 240, output device(s) 250, database(s) 130, and/or other components.

In an implementation, one or more components of system 200 may comprise one or more computer program instructions of FIG. 1 and/or processor(s) 112 programmed with the computer program instructions of FIG. 1. As an example, speech recognition engine(s) 220, zero-pass processing engine 225, and/or NLP/NLU engine(s) 230 may comprise user input processing instructions 118, domain-related instructions 131, first domain-determination instructions 132, second domain-determination instructions 134, domain-confirmation instructions 136, and/or other instructions.

Input device(s) 210 may comprise an auditory input device (e.g., microphone), a visual input device (e.g., camera), a tactile input device (e.g., touch sensor), an olfactory input device, a gustatory input device, a keyboard, a mouse, or other input devices. Input received at input device(s) 210 may be provided to speech recognition engine(s) 220 and/or NLP/NLU engine(s) 230.

Speech recognition engine(s) 220 may process one or more inputs received from input device(s) 210 to recognize one or more words represented by the received inputs. As an example, with respect to auditory input, speech recognition engine(s) 220 may process an audio stream captured by an auditory input device to isolate segments of sound of the audio stream. The sound segments (or a representation of the sound segments) are then processed with one or more speech models (e.g., acoustic model, lexicon list, language model, etc.) to recognize one or more words of the received inputs. Upon recognition of the words of received inputs, the recognized words may then be provided to zero-pass processing engine 225, and/or NLP/NLU engine(s) 230 for further processing. In other examples, zero-pass processing engine 225, and/or NLP/NLU engine(s) 230 may process one or more other types of inputs (e.g., visual input representing sign language communication, gestures, or other forms of communication) to recognize one or more words represented by the other types of inputs.

Zero-pass Processing

Zero-pass processing engine 225 may receive one or more inputs from input device(s) 210, speech recognition engine(s) 220, application(s) 240, database(s) 130, or other components. In an implementation, operations related to processing of user input and determining suitable action by zero-pass processing engine 225 are performed before and as a faster alternative to the natural language processing by NLP/NLU engines 230. As an example, zero-pass processing engine 225 may process inputs received from input device(s) 210 or speech recognition engine(s) 220 based matching an exact phrase or text string of a user input to entries in one or more look up tables to determine an action or task responsive to the user input. The look up table(s) (or similar data structure) used by zero-pass processing engine 225 may be stored at database(s) 130, and may be pre-configured to include a listing of a number of fixed text strings or phrases, and a set of corresponding actions to be executed (e.g., in relation to application(s) 240 and output device(s) 250) to respond to the user request.

The look up tables may be generated based on a collection of user logs (anonymously) recorded over one or more certain periods of time for a plurality of users. Such user logs may include specific text strings provided (e.g., spoken) by users as inputs to system 104, and computer-executable actions that were determined and performed responsive to those specific text strings. In an implementation, if a particular and exact text string (e.g., "call mom") is frequently found in the user logs (e.g., every $n^{th}$ entry in the logs), that particular text string is selected to be added to the look up table(s) with an associated set of actions responsive to the text string. For example, one of the listings of the look up table may include a text string "call mom" with the corresponding set of actions (e.g., performed using application(s) 240) including searching for a contact named "mom" in a contact information database, extracting a phone number for the contact "mom," and initiating a phone call from a user device to the extracted phone number. In the look up table(s), many text strings may have a same set of actions associated therewith, e.g., "call mom" and "dial mother's phone" may be associated with a same set of phone call-related actions.

The look up table(s) may include one or more static look up tables, and one or more dynamic look up tables. In an implementation, the static look up tables include text string-action entries which may not be updated or modified based on user environment, context, and/or other criteria. For example, the static look up tables may include entries such as "call mom," "watch ESPN," "open e-mail," etc., each of which are associated with a fixed set of actions that are performed responsive to the text string, where these text strings and their associated actions may not be modified or updated over time.

On the other hand, dynamic look up table(s) may include text string-action entries that relate to a specific location, event, context, etc. For example, based on recent user logs (e.g., collected for the past one week), it may be determined that a number of frequent user requests (having exactly same phrases) relate to a certain event. For example, user logs collected during late January/early February may indicate that many frequent user requests relate to NFL Super Bowl with exact input phrases such as "what day is the Super Bowl," "weather for Super Bowl," etc. Accordingly, a "Super Bowl" dynamic table may be generated with event-specific entries and corresponding sets of computer-executable actions. The dynamic look up table(s) may be updated, modified, or deleted when the underlying location, event details, context, etc., change.

In an implementation, before the user input, e.g., from speech recognition engine 220, is provided to NLP/NLU engine(s) 230, the user input is provided to zero-pass processing engine(s) 225 that accesses the look up table(s) in the database(s) 130, determines whether any entry in the look up table(s) exactly matches the text string of the user input. If a match is found, zero-pass processing engine(s) 225 extracts the set of actions associated with the matched table entry, determines application(s) 240 that may execute (or facilitate execution of) the set of actions, and provides the set of actions to the determined application(s) 240 for execution responsive to the user input. In this case, since the intended user request is addressed by zero-pass processing engine(s) 225, the user input may not be provided to NLP/NLU engine(s) 230 for any further processing. If, however, a match at the look up table(s) is not found, the user input may be provided to the NLP/NLU engine(s) 230 for further processing and execution as discussed below.

Natural Language Processing/Understanding

NLP/NLU engine(s) 230 may receive one or more inputs from input device(s) 210, speech recognition engine(s) 220, application(s) 240, database(s) 130, or other components. As an example, NLP/NLU engine(s) 230 may process inputs received from input device(s) 210, such as user inputs (e.g., voice, non-voice, etc.), location-based inputs (e.g., GPS data, cell ID, etc.), other sensor data input, or other inputs to determine context information associated with one or more user inputs. As another example, NLP/NLU engine(s) 230 may obtain grammar information, profile information, context information, or other information from database(s) 130. The obtained information (or context information determined based on inputs from input device(s) 210) may be processed to determine one or more intended user requests associated with one or more user inputs of a user. In yet another example, NLP/NLU engine(s) 230 may process one or more recognized words ("triggers") from speech recognition engine(s) 220 and other information (e.g., information from input device(s) 210, application(s) 240, and/or database(s) 130) to determine one or more intended user requests associated with one or more user inputs of a user.

In an implementation, NLP/NLU engine(s) 230 may solicit further inputs from a user by responding with a request for more information via output device(s) 250 if, for instance, a user request associated with a user input of a user cannot be determined with sufficient confidence, more information would helpful to process the user request, etc.

An example of the processing of the user request by NLP/NLU engine(s) 230 may include the operations of predicting one or more information domains to which the user request may belong (e.g., indicating a type of action needed to complete the request and/or a type of entity mentioned in the request); assigning a confidence score to each of the potential domains; selecting the domain with the highest confidence score as the domain to the user request belongs; confirming whether the selected domain is the correct domain to which the user request should be assigned or classified; and if so, selecting an action or task related to the selected (and confirmed) domain to respond to the intended user request. To perform these and other natural language processing operations, NLP/NLU engine(s) 230 may include one or more components, e.g., as illustrated in FIG. 3, configured for one or more of the foregoing operations.

Figure 3:
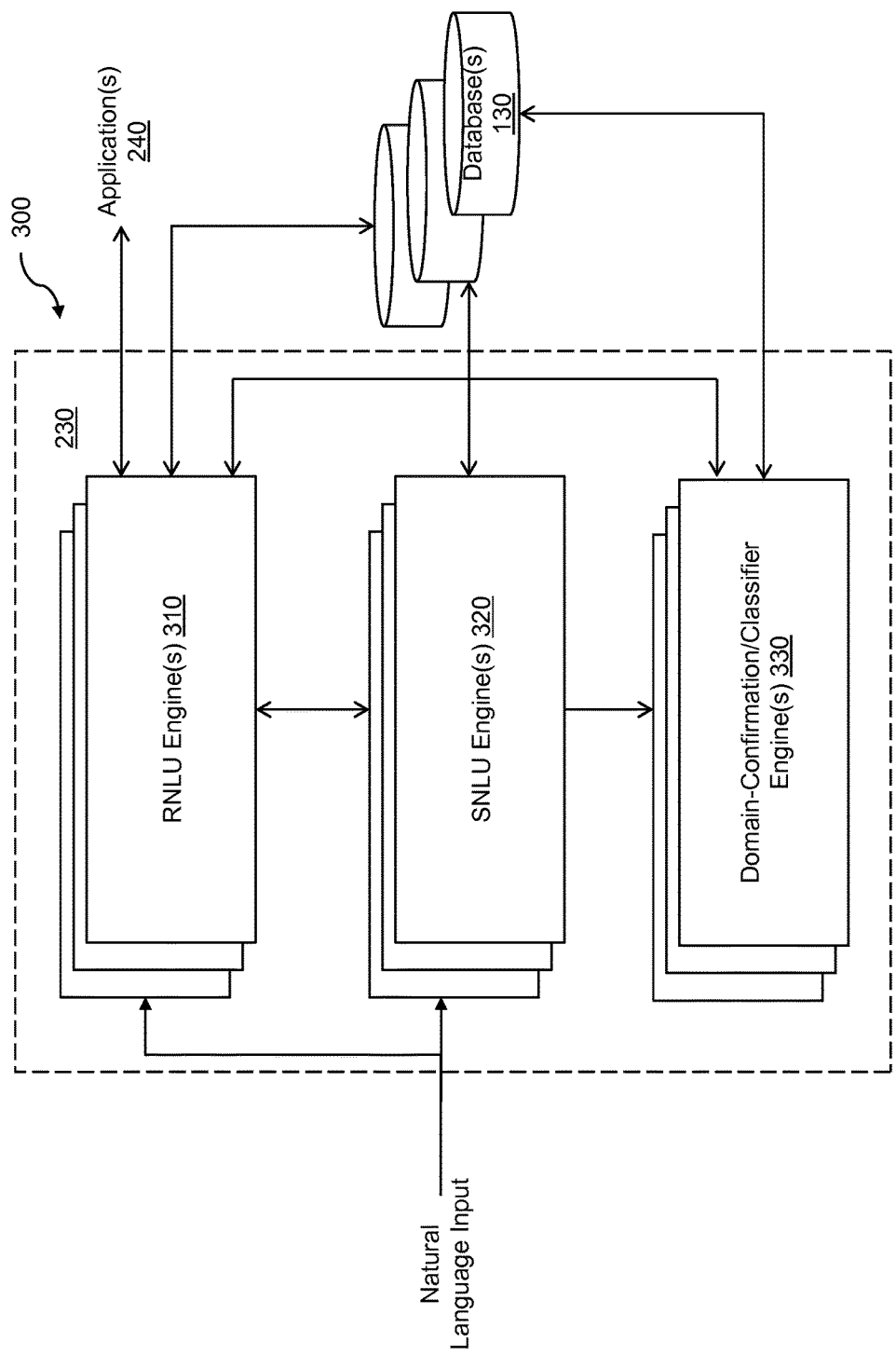
FIG. 3 illustrates a system to facilitate natural language processing of a natural language input, according to an implementation of the present disclosure.

FIG. 3 illustrates a system 300 for facilitating natural language processing/understanding at NLP/NLU engine(s) 230, according to an implementation of the present disclosure. As shown in FIG. 3, system 300 may include rules-based NLU (RNLU) engine(s) 310, statistic-based NLU (SNLU) engine(s) 320, and classifier engine(s) 330, and/or other components. In an implementation, system 300 may determine an information domain (from among a plurality of pre-configured domains) to which a natural language (NL) user input belongs. System 300 may then confirm whether the NL input is correctly matched to the determined information domain. Determining the correct domain(s) to which the NL input belongs facilitates system 300 to accurately extract or understand intent of (or a nature of the request indicated in) the NL input. Based on that understanding, system 300 may identify or determine specific computer-executable actions related to those domain(s), which, when executed, are responsive to the intended request in the NL input.

In an implementation, one or more components of system 300 may comprise one or more computer program instructions of FIG. 1 and/or processor(s) 112 programmed with the computer program instructions of FIG. 1. As an example, RNLU engine(s) 310, SNLU engine(s) 320, and classifier engine(s) 330 may comprise user input processing instructions 118, domain-related instructions 131, first domain-determination instructions 132, second domain-determination instructions 134, domain-confirmation instructions 136, and/or other instructions.

RNLU Processing

In an implementation, RNLU engine(s) 310 may employ rules-based (or grammar-based) semantic pattern matching to parse and understand a meaning and intent of an NL input (in one or more languages). For example, RNLU engine(s) 310 may parse a received NL user input into one or more tokens according to a lexicon and a semantic grammar. Based on the tokens and the semantic grammar, RNLU engine(s) 310 may classify the NL input into one or more of many pre-configured domains or classes. RNLU engine(s) 310 may also generate a score for each of the domains determined to be associated with the NL input, where the score indicates the confidence level of the NL input belonging to that domain. The grammar, lexicon, corpus, rules, agents, and other rules-based components used by RNLU engine(s) 310 may be generated and updated manually by linguistic experts or by automatic machine learning techniques, and stored at database(s) 130.

The pre-configured domains or classes may be defined as part of or related to the semantic grammar of RNLU engine(s) 310, and may be stored at database(s) 130. These domains may be "action-centric," i.e., each domain may represent a specific type of (computer-executable) task or action performed for a given NL input (e.g., a "call" domain, a "map" domain, a "shop" domain, a "play" domain, a "record" domain, an "online search" domain, etc.). For example, the input "buy coffee" may be classified to the "shop" domain based on the recognition (by RNLU engine(s) 310) of the action term "buy", and the input "call Jack and order pizza" may be determined as belonging to both "call" and "shop" domains based on the action terms "call" and "order," respectively.

Additionally, or alternatively, the pre-configured domains may be "entity-centric," i.e., each domain may represent a specific type of entity or subject mentioned in or related to a given NL input (e.g., a "song" domain, a "business" domain, a "person" domain, etc.) for which a certain task or action is to be performed responsive to the NL input. For example, the inputs "call Peter" and "meet Peter on Friday" both may be classified under the "person" domain based on the recognition (by RNLU engine(s) 310) of the term "Peter" in the inputs as a person's name. In an implementation, one or more domains may be a combination of an "action-centric" domain and an "entity-centric" domain. For example, a domain may be directed to "call business."

In general, a domain may include a set of information that includes subject matter that may be searched or otherwise executed on. For example, a domain may include a listing of action terms (e.g., similar action terms that result in a same action or task), a listing of businesses, a listing of addresses, a listing of songs, a listing of personal contacts, and/or other corpus of information that may be searched, played or otherwise executed. An information item or listing in a domain may be associated with a keyword. For example, a listing of action terms in the "shop" domain may include terms or keywords such as "buy," "purchase," "pay," etc. A listing of businesses (in the "business" domain) may include the name of a business and/or other business-related information. A listing of songs (in the "music" domain) may include a song title, artist name, genre, and/or other song-related information. The domains may be indexed to facilitate rapid searching of its content, such as its keywords.

In an implementation, the grammar or other rules-based components used RNLU engine(s) 310 may include rules to remove or ignore "non-salient" terms from the NL input without changing its meaning. For example, based on these rules, RNLU engine(s) 310 may remove "non-salient" words such as "please," "thanks" etc., articles of prepositions, etc., from the NL input before determining a domain for the NL input. Such rules may also include ignoring morphological variations such as pluralization, etc. These rules may also specify exceptions as to specific phrase(s) or specific type(s) of phrase(s) for which the "non-salient" words should not be removed or ignored for the processing of the NL input. For example, although ignoring the word "on" in the phrase "call John on Friday" may not affect its meaning (in terms of natural language understanding), in the phrase "Turn on Madonna," removing or ignoring "on" would render the phrase being misinterpreted or meaningless. Accordingly, specific rules and their exceptions may be written in the grammar with respect to the "non-salient" terms to improve computational efficiency.

In operation, as one example, RNLU engine(s) 310 may receive a spoken NL utterance input, e.g., "send text to Larry saying "I cannot call John tomorrow"" from speech recognition engine(s) 220 (e.g., after the zero-pass processing failed). RNLU engine(s) 310 may generate one or more tokens for the NL input based on the related lexicon and grammar. The token(s) may represent each word, each possible pair of words, and/or other combinations of words in the NL input. As such, the tokens generated by RNLU engine(s) 310 may relate to uni-grams, bi-grams, tri-grams, and/or other n-grams. For example, for the foregoing NL input, tokens may include "send," "text," "call," "send text," "call tomorrow," "send text tomorrow," "Larry," "John," "tomorrow," etc. The tokens may be stored at database(s) 130.

RNLU engine(s) 310 may process the token(s) based on the semantic grammar to determine or identify one or more domains to which the NL input belongs. Based on the domain(s) for the NL input, RNLU engine(s) 310 may be able to identify one or more computer-executable tasks and one or more entities involved with the tasks needed to complete the intended request of the NL input. In an implementation, RNLU engine(s) 310 may identify a plurality of possible domains for the NL input, and generate and assign a confidence score (e.g., in terms of probabilities) for each of the possible domains (as an "n-best" list). For example, for the foregoing NL input, RNLU engine(s) 310 may determine and list that the NL input is associated with the "call" domain with a confidence score equal to 0.8 (out of 1), and the "send text" domain with a confidence score equal to 0.2. It may also be possible that the domains defined in relation to the semantic grammar of RNLU engine(s) 310 do not include the "send text" domain (or any other texting-related domains). RNLU engine(s) 310 may thus determine that the NL input is associated with only one domain, e.g., the "call" domain with a confidence score equal to 1.

In addition to identifying domains, RNLU engines(s) 310 may also generate parameters related to the process of domain determination/identification. For example, RNLU engines(s) 310 may generate parameters or "feature value set" including a number of tokens matched, a fraction number of the tokens matched, a matching score assigned to at least one of the tokens, and a matching score assigned to the complete NL input, and/or other parameters.

In an implementation, RNLU engine(s) 310 may determine that the NL input belongs to domain with the highest confidence score (however, other criteria may be used). As such, in this case, RNLU engine(s) 310 may determine that the NL input belongs to the "call" domain, e.g., indicating that the user intends to (immediately) place a phone call to a contact named "John." Given the NL input, such interpretation is obviously incorrect, as the user intends to send a text message to Larry (and the correct domain should be the "send text" domain), and not call John. Accordingly, based on the erroneous assignment of the NL input to the "call" domain, RNLU engine(s) 310 may identify and/or execute an unintended or erroneous action (e.g., initiating a phone call to "John"), resulting in an inefficient and unsatisfactory user experience.

SNLU Processing

Accordingly, to ensure that the NL input is correctly assigned to an intended domain (and a correct and appropriate computer-executable action is determined and performed), NLP/NLU engine(s) 230 may employ another NLU system, e.g., SNLU engine(s) 320. SNLU engine(s) 320 may receive the same NL input as the RNLU system ("send text to Larry saying "I cannot call John tomorrow""). SNLU engine(s) 320 process the NL input based on a machine learning classification technique and associated training data (stored at database(s) 130, for example) to determine the NL input's domain(s).

The machine learning classification technique used by SNLU engine(s) 320 may be based on one or more of a maximum-entropy classifier, a logistic regression classifier, a Naïve Bayes classifier, a support vector machine, and/or other classifiers known in the art. The training data used by SNLU engine(s) 320 may be pre-established and static for the classification technique used therein, and/or may be dynamically updated based on information obtained from the NL input. In an implementation, the training data includes a pool of words, known domains or classes for the pool of words, and various probabilities and statistics associated with the words and their domains. Before processing the unknown (and real-time) inputs, the machine learning classification technique is first trained to classify the words from the training data pool. Once satisfactorily trained, SNLU engine(s) 320 may then accept the NL input, e.g., as above, to determine its domains.

SNLU engine(s) 320 may obtain tokens of the NL input described above (e.g., from database(s) 130 or RNLU engine(s) 310) and generate an input feature vector. Each element of the input feature vector may represent at least one of the tokens of the NL input. SNLU engine(s) 320 may the feature vector as the input to the statistical classification technique configured therein (e.g., a maximum-entropy classification technique), and determine one or more domains to which the NL input possibly belongs. SNLU engine(s) 320 may also generate one or more confidence scores (e.g., probability values) corresponding to the one or more determined domains, the confidence scores indicating the likelihood of the NL input belonging to the respective domains.

For example, for the foregoing NL input, SNLU engine(s) 320, based on the statistical classification technique thereof, may classify the NL input to (a) "send text" domain with a confidence score equal to 0.5 (out of 1), (b) "call" domain with a confidence score equal to 0.4, and (c) "set reminder" domain with a confidence score equal to 0.1. In an implementation, SNLU engine(s) 320 may also generate a parameter value (e.g., a binary value) indicative of whether the domains determined by SNLU engine(s) 320 are related to the domains specified for and associated with RNLU engine(s) 310 (or its semantic pattern matching technique).

Confirming Domain Correctness

In an implementation, NLP/NLU engine(s) 230 may utilize and process the outputs of RNLU engine(s) 310 and SNLU engine(s) 320 to ascertain whether the NL input correctly belongs to the domain determined by RNLU engine(s) 310. For example, NLP/NLU engine(s) 230 may include a classifier engine(s) 330 including a statistical classifier (e.g., a logistic classifier). Classifier engine(s) 330 may accept, as its input, identification information and confidence score(s) of the domain(s) determined by RNLU engine(s) 310, the feature value set from RNLU engine(s) 310, identification information and confidence score(s) of the domain(s) determined by SNLU engine(s) 320, the binary value from SNLU engine(s) 320, and/or other RNLU and SNLU-related parameters.

Classifier engine(s) 330 may arrange the inputs as a feature vector for the classification technique implemented therein, and obtain training data (e.g., trained weight values) from database(s) 130. In an implementation, classifier engine(s) 330 may process the input feature vector based on the weight values to generate a confirmation score related to the domain determined by RNLU engine(s) 310 (e.g., "call" domain in the above example). Classifier engine(s) 330 may compare the confirmation score with a certain (pre-defined) threshold, and based a result of the comparison, determine whether the NL input correctly belongs to the domain determined by RNLU engine(s) 310 ("call" domain).

For example, with regard to the foregoing example, classifier engine(s) 330, based on the parameters provided by the SNLU and RNLU systems, may calculate a confirmation score of 0.3 for the "call" domain. Comparing with a fixed threshold of 0.5, classifier engine(s) 330 may conclude that, since the confirmation score (0.3) of the "call" domain is lower than the threshold (0.5), the NL input does not belong to the "call" domain. In other words, the result of the threshold comparison indicates that the assessment of RNLU engine(s) 310 that user utterance belongs to the "call" domain is erroneous. Accordingly, NLP/NLU engine(s) 230 may not advance the processing of the NL input, e.g., NLP/NLU engine(s) 230 may not prepare for or execute an action (e.g., initiating a phone call) responsive to the NL input.

In this case, classifier engine(s) 330 or NLP/NLU engine(s) 230 may output a message to the user indicating that computer system 104 is not configured to complete the request indicated in the NL input and/or requesting another NL input from the user. Alternatively, NLP/NLU engine(s) 230 may request RNLU engine(s) 310 to consider another domain for the original NL input (e.g., "send text" domain that RNLU engine(s) 310 determined to be less likely than "call" domain). In that case, RNLU engine(s) 310 may provide a new feature value set (as discussed above) for "send text" domain. Classifier engine(s) 330 may process the new outputs from RNLU engine(s) 310 along with the (previously-computed) outputs from SNLU engine(s) 320 to determine whether the NL input belongs to "send text" domain (based on the threshold comparison discussed above).

Once classifier engine(s) 330 confirms that the NL input has been correctly classified to the domain determined by RNLU engine(s) 310, RNLU engine(s) 310 may identify and trigger execution of one or more (pre-defined) actions or applications 240 responsive to the NL input. In an implementation, upon determination of the intended domain and requested task in the NL input, NLP/NLU engine(s) 230 may determine an application 240 suitable for executing the requested task, and provide the task to the application for further processing. In one scenario, application 240 may provide one or more results of the execution and/or completion of the task to output device(s) 250 for presentation to the user.

In an implementation, application 240 may provide the results of the task to NLP/NLU engine(s) 230 for further processing. As an example, the results of the task may comprise intermediate results that are provided as a parameter for another task that is to be executed at another application 240. As such, the NLP/NLU engine(s) 230 may generate the other task based on the intermediate results, and provide the other task to the other application 240. As another example, NLP/NLU engine(s) 230 may formulate a natural language response (e.g., a phrase) based on the results received from the application 240, and provide the natural language response to output device(s) 250 for presentation to the user.

In an implementation, a given application 240 may obtain profile information, account information, or other information from database(s) 130 to authenticate a user before executing a user request in an NL input. As an example, application 240 may be part of a given service provider. As such, the application 240 may determine whether the user has access to one or more services associated with the application 240 before executing the user request on behalf of the user.

In an implementation, a given application 240 may obtain content from database(s) 130 and/or content provider(s) 160 to provide one or more results of a user request of a user. In one use case, where the user request comprises a command to play a media item (e.g., song, video clip, movie, etc.), and the application 240 comprises a media stream application, the application 240 may obtain the media item from a given content provider(s) 160 and stream the media item to output device(s) 250 for presentation to the user.

Figure 7:
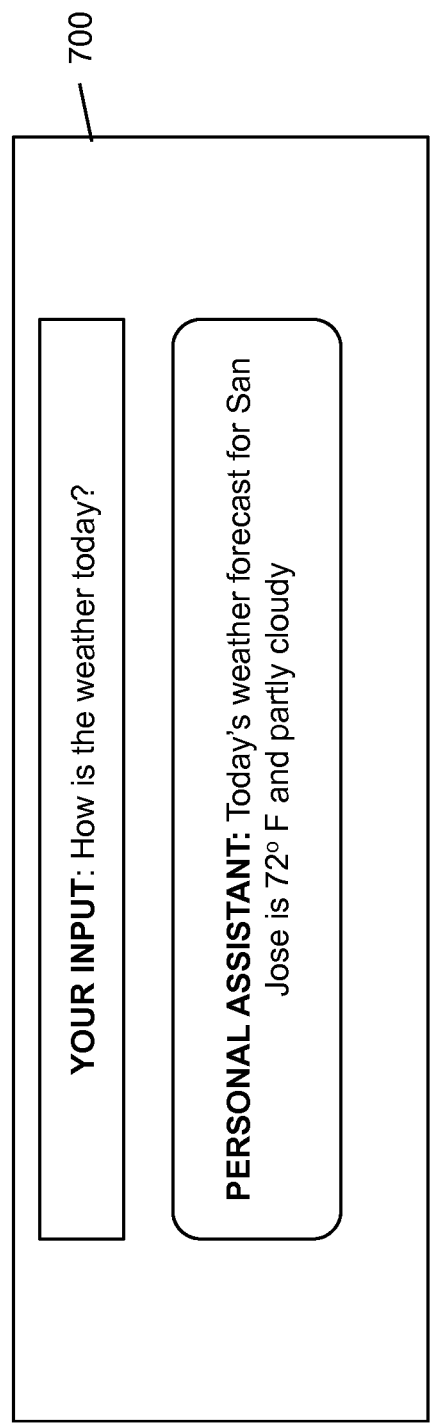
FIG. 7 illustrates a screenshot of a user interface which provides a response, according to an implementation of the present disclosure.

FIG. 7 illustrates a screenshot 700 of a user interface which provides a response to a NL user input based on natural language processing/understanding, according to an implementation of the present disclosure. The screenshots may be accomplished using some or all of the system components described in detail above. With respect to screenshot 700, a user (e.g., located in San Jose, Calif.) may provide a NL input (e.g., NL utterance or other input) indicating a user request for weather information ("How is the weather today?") to an application associated with the depicted user interface (e.g., a personal assistant application). Based on the natural language processing/understanding techniques discussed above, the system may determine and/or confirm that the user request belongs to the "weather" domain. Accordingly, application(s) 240 related to weather, location, etc., may be activated to retrieve, generate and/or format appropriate weather information for presenting to the user. In this example, as depicted, a personal assistant response "Today's weather forecast for San Jose is 72° F. and partly cloudy" is displayed at the user interface in response to the user request.

Unsupported Feature Handling

Figure 8:
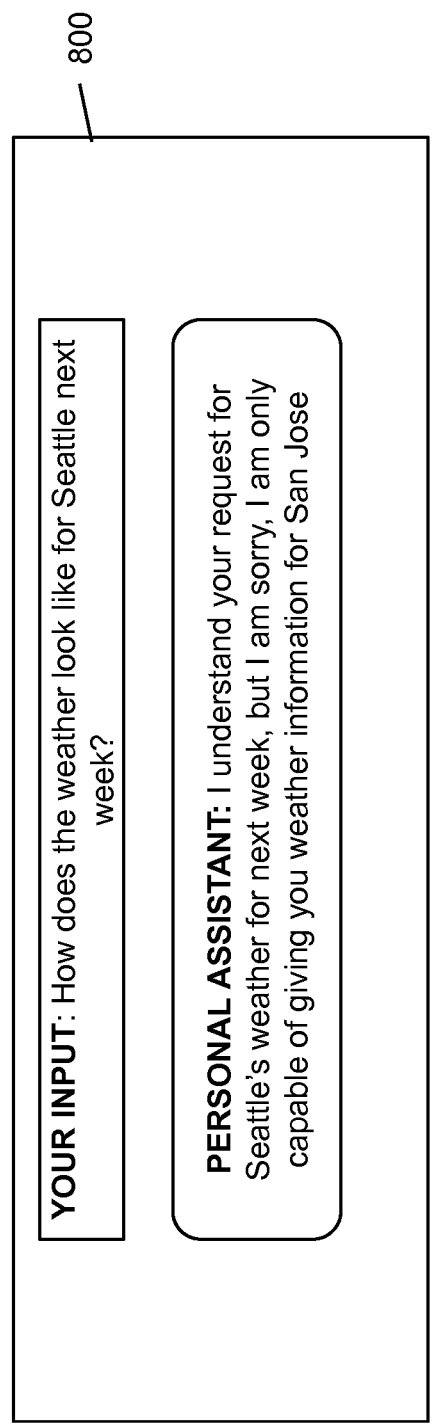
FIG. 8 illustrates a screenshot of a user interface which provides a response indicating an unsupported feature, according to an implementation of the present disclosure.

In an implementation, although NLP/NLU engine(s) 230 may be able to determine and/or confirm the domain for the NL input (i.e., understand the intent and/or requested task of the NL input), NLP/NLU engine(s) 230 or other components of system 200 may not be configured to execute the intended task and generate an appropriate response for the user. For example, as illustrated in a screenshot 800 of FIG. 8, a user may provide input "How does the weather look like for Seattle next week?" and based on the natural language processing/understanding techniques discussed above, the system may be understand that the user input relates to "weather" and "Seattle." However, NLP/NLU engine(s) 230 or other components of system 200 may be limited to only providing weather information for the user's current location and time, and may not be configured to, or capable of, retrieving and providing the requested weather forecast for another location (Seattle) and another time (next week). For example, there may not be an application 240 configured in system 200 to handle such requests.

In this regard, because the system understands the user request but cannot execute it, the system (e.g., an application 240 to handle such "unsupported requests") may provide a response to the user indicating that the service or feature requested by the user is not supported by the system. For example, as depicted, a personal assistant response "I understand your request for Seattle's weather for next week, but I am sorry, I am only capable of giving you weather information for San Jose" may be displayed at the user interface in response to the user request. As such, the user would know about the system's limitations, and may not repeat the request under the assumption that the system did not understand the request the first time.

In an implementation, NLP/NLU engine(s) 230, application(s) 240, or other components may store information in database(s) 130 for later use by NLP/NLU engine(s) 230, application(s) 240, or other components. As an example, NLP/NLU engine(s) 230 may store information regarding user inputs in database(s) 130 and/or update profile information, grammar information, training data for engine(s) 320, 330, or other information in database(s) 130 based on the information regarding the user inputs.

Hybrid NLP/NLU Processing

As discussed above, RNLU engine(s) 310, SNLU engine(s) 320 and/or other NLP/NLU engines may determine a plurality of domains to which an NL input likely belongs, and their corresponding confidence scores indicating the likelihood with which the NL input is related to the respective domain. The domains and confidence scores may be determined based on rules, grammar, context information, etc., associated with the NLP/NLU engines. In an implementation, NLP/NLU engine(s) 230 may be configured with a hybrid NLP/NLU technique in which the domains and confidence scores from RNLU engine(s) 310 and/or SNLU engine(s) 320 are improved or updated based on information from a database or search engine service. For example, FIG. 9 illustrates a system 900 for facilitating natural language processing/understanding at NLP/NLU engine(s) 230, according to another implementation of the present disclosure.

Figure 9:
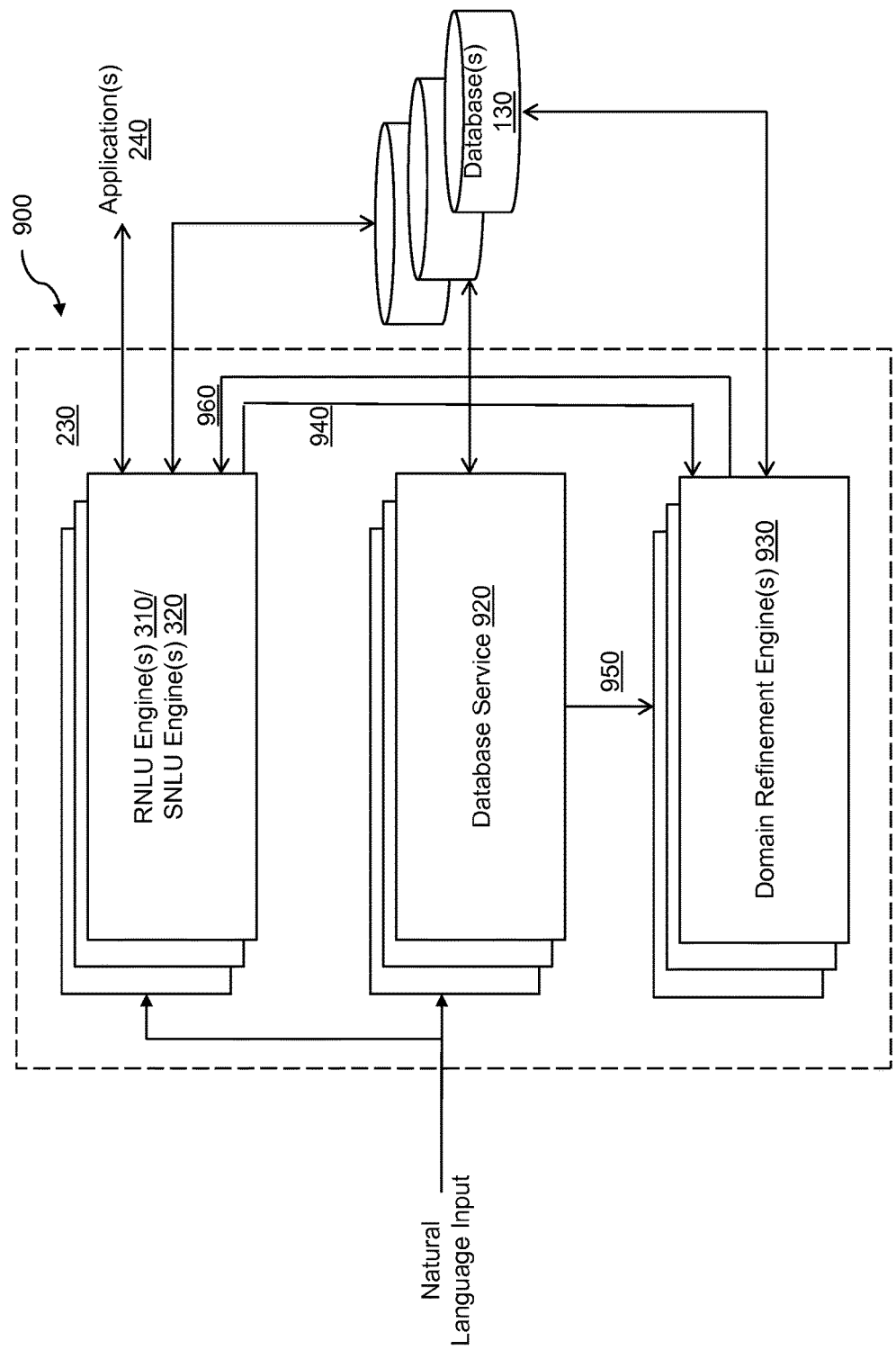
FIG. 9 illustrates a system to facilitate hybrid natural language processing, according to an implementation of the present disclosure.

As shown in FIG. 9, system 900 may include rules-based NLU (RNLU) engine(s) 310, statistic-based NLU (SNLU) engine(s) 320, database service 920, domain refinement engine(s) 930 and/or other components. In an implementation, RNLU engine(s) 310/SNLU engine(s) 320 may receive an NL input (e.g., from speech recognition engine(s) 220) and parse the NL input based on the techniques discussed above to determine possible domain(s) and confidence score(s) for the NL input. For example, for an NL input "find details about beatles," RNLU engine(s) 310/SNLU engine(s) 320 may determine that the NL input belongs to the "music" domain with a confidence score of 0.3 (out of 1), the "living organism" domain with a confidence score of 0.5, the "car" domain with a confidence score of 0.2, and/or other domains. In an implementation, based on the confidence scores, RNLU engine(s) 310/SNLU engine(s) 320 may determine that the NL input belongs to the domain with the highest confidence score, i.e., "living organism" domain in this example.

Further, the NL input may also be provided to database service 920, which may be a third-party search engine (e.g., Google) or a service/application to search information from database(s) 130, and/or other similar services. In an implementation, database service 920 takes the NL input as a search query, and generates search results relevant to the search query. Database service 920 may parse and process the search results to classify the search results into one or more predefined categories. Further, database service 920 may rank the search results (or their categories) and assign them a ranking score. For instance, considering the above example, database service 920 may perform a search for the input "find details about beatles," and generate results (e.g., links to websites) mostly related to the band "The Beatles," but also some results related to the insect "beetle," the car "Volkswagen Beetle," etc. Based on the number of results obtained in each category (and/or other criteria), database service 920 may assign the highest ranking score to the band-related results (e.g., rank score equal to 10), second highest ranking score to the insect-related results (e.g., rank score equal to 7), third highest ranking score to the car-related results (e.g., rank score equal to 6), and so on.

In an implementation, the RNLU/SNLU engines may provide the domain information and domain confidence score(s) to domain refinement engine(s) 930 (as shown by directional flow 940). Also, database service 920 may provide the result categories information and ranking scores to domain refinement engine(s) 930 (as shown by directional flow 950) for further refinement or strengthening of the determination of the intended domain. For example, domain refinement engine(s) 930 may consider and process the domain confidence score set and the ranking score set to determine whether the domain decided upon by RNLU engine(s) 310/SNLU engine(s) 320 is correct, and generate an output value (e.g., a binary value) to indicate the determination result. Additionally, or alternatively, based on ranking score set, the domain refinement engine(s) 930 may generate its own preference order of the domains with corresponding refinement scores. For example, based on ranking score set of [band=10, insect=7, car=6], domain refinement engine(s) 930 may update the domain set from RNLU/SNLU engines [music=0.3, living organism=0.5, car-0.2] to indicate that, instead of the "living organism" domain, the NL input most likely belongs to the "music" domain. Accordingly, domain refinement engine(s) 930 may generate a domain refinement score set of [music=0.6, living organism=0.25, car-0.15].

In an implementation, domain refinement engine(s) 930 may provide the domain refinement score set to the RNLU/SNLU engines (as shown by directional flow 960). RNLU 310/SNLU 320 engines may select the domain that has the highest score in the domain refinement score set, e.g., the "music" domain (instead of the "living organism" domain) in this example. Accordingly, based on the information from domain refinement engine(s) 930, RNLU 310/SNLU 320 engines are able to confirm or update the initially-determined domain, which may result in accurately assessing the intent and request action in the NL input.

In an implementation, upon determination of the intended domain and requested task in the NL input, NLP/NLU engine(s) 230 (or its RNLU/SNLU engines) may determine an application 240 suitable for executing the requested task, and provide the task to the application for further processing. In one scenario, application 240 may provide one or more results of the execution and/or completion of the task to output device(s) 250 for presentation to the user.

Examples of System Architectures and Configurations

Different system architectures may be used. For example, all or a portion of instructions 120, 131, 132, 134, 136 (or other instructions described herein) may be executed on a user device. In other words, computing device 110 as illustrated may include a user device operated by the user. In implementations where all or a portion of instructions 120, 131, 132, 134, 136 are executed on the user device, the user device may interface with database(s) 130, service provider(s) 140 and/or content provider(s) 150 to retrieve information, determine a context, domain and intended task in an NL input, and/or perform other functions/operations of instructions 120, 131, 132, 134, 136.

As another example, all or a portion of instructions 120, 131, 132, 134, 136 (or other instructions described herein) may be executed on a server device. In other words, computing device 110 as illustrated may include a server device that obtains a user input from a user device operated by the user. In implementations where all or a portion of instructions 120, 131, 132, 134, 136 are executed on the server device, the server may interface with database(s) 130, service provider(s) 140 and/or content provider(s) 150 to retrieve information, determine a context, domain and intended task in an NL input, and/or perform other functions/operations of instructions 120, 131, 132, 134, 136.

Although illustrated in FIG. 1 as a single component, computer system 104 may include a plurality of individual components (e.g., computer devices) each programmed with at least some of the functions described herein. In this manner, some components of computer system 104 may perform some functions while other components may perform other functions, as would be appreciated. Processor(s) 112 may each include one or more physical processors that are programmed by computer program instructions. The various instructions described herein are exemplary only. Other configurations and numbers of instructions may be used, so long as processor(s) 112 are programmed to perform the functions described herein.

It should be appreciated that although the various instructions are illustrated in FIG. 1 as being co-located within a single computing device 110, one or more instructions may be executed remotely from the other instructions. For example, some computing devices 110 of computer system 104 may be programmed by some instructions while other computing devices 110 may be programmed by other instructions, as would be appreciated. Furthermore, the various instructions described herein are exemplary only. Other configurations and numbers of instructions may be used, so long as processor(s) 112 are programmed to perform the functions described herein.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor(s) 112 as well as data that may be manipulated by processor(s) 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

User device(s) may include a device that can interact with computer system 104 through network 102. Such user device(s) may include, without limitation, a tablet computing device, a smartphone, a laptop computing device, a desktop computing device, a network-enabled appliance such as a "Smart" television, a vehicle computing device, and/or other device that may interact with computer system 104.

The various databases 130 described herein may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may comprise one or more such databases that reside in one or more physical devices and in one or more physical locations. The database may store a plurality of types of data and/or files and associated data or file descriptions, administrative information, or any other data. The database(s) 130 may be stored in storage device 114 and/or other storage that is accessible to computer system 104.

Example Flow Diagrams

The following flow diagrams describe operations that may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

FIGS. 4, 5, 6, 10 illustrate flow diagrams of methods directed to process a natural language input to generate an appropriate and accurate response, according to various implementations of the present disclosure. The various processing data flows depicted in these figures (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Figure 4:
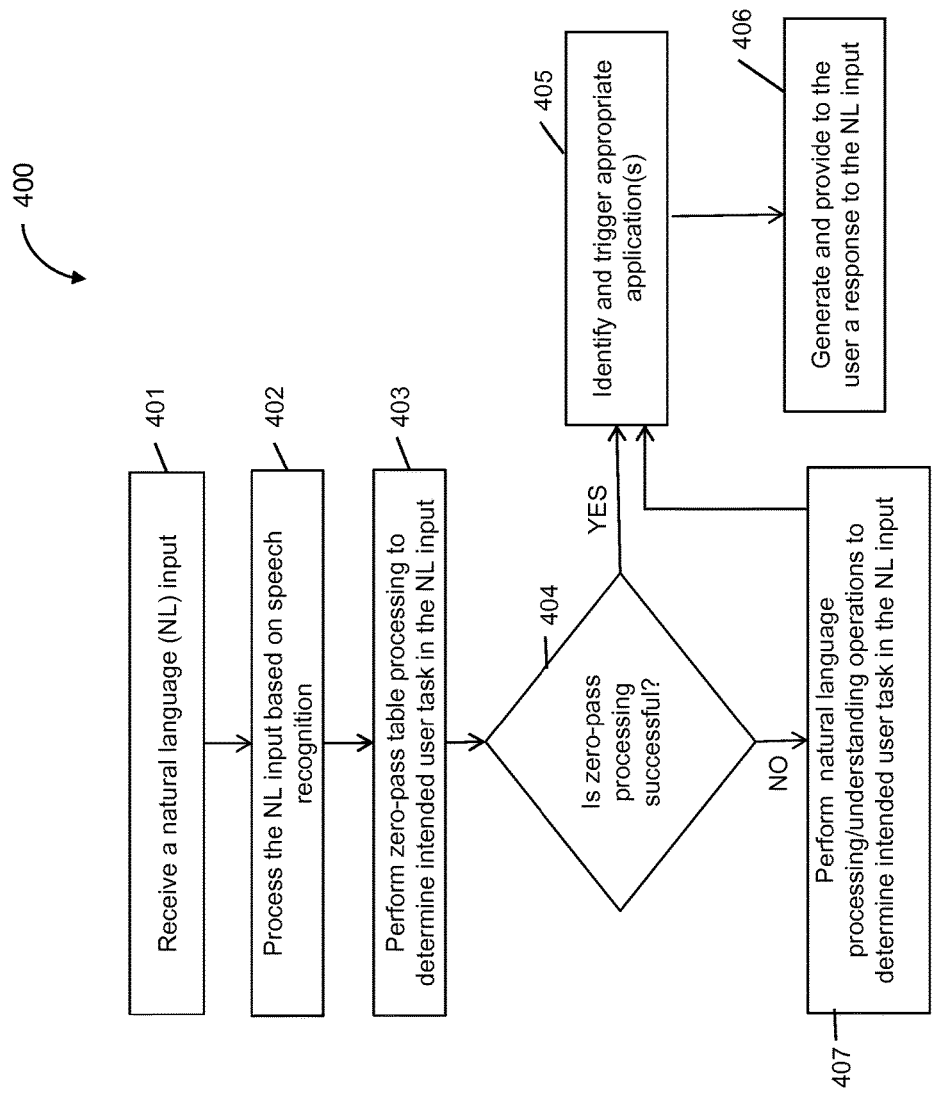
FIG. 4 illustrates a flow diagram for a method to process a natural language input, according to an implementation of the present disclosure.

Referring to FIG. 4, in an operation 401, a natural language (NL) input may be received, e.g., from input device(s) 210. In an operation 402, if the NL input is a spoken utterance, the NL input is processed based on one or more speech recognition techniques at speech recognition engine(s) 220 to convert audio of the user input to text (including words and phrases). In an operation 403, the NL input is provided to zero-pass processing engine(s) 225 to determine the intent and requested task in the NL input based on one or more table look up techniques as discussed above.

For example, with regard to an operation 404, if it is determined that the word(s) or phrase(s) in the NL input match exactly with an entry in the look up table(s) (i.e., output "YES"), the corresponding action(s) listed in the look up table for that entry is identified. In an operation 405, one or more applications 240 that may be used to perform the identified action are identified and triggered. In an operation 406, based on the execution of the appropriate application(s) 240, a response to the NL input is provided to the user.

Still with regard to an operation 404, if it is determined that the word(s) or phrase(s) in the NL input do not match exactly with any entry in the look up table(s) (i.e., output "NO"), the process flow is directed to processing the NL input based on natural language processing/understanding techniques, e.g., provided by NLP/NLU engine(s) 230. For example, in an operation 407, the NL input is processed at NLP/NLU engine(s) 230 to determine a domain to which the NL input belongs, and thus understand the intent and request action for the NL input.

Upon determining the intended action for the NL input, in operation 405, one or more applications 240 that may be used to perform the identified action are identified and triggered. In an operation 406, based on the execution of the appropriate application(s) 240, a response to the NL input is provided to the user.

Figure 5:
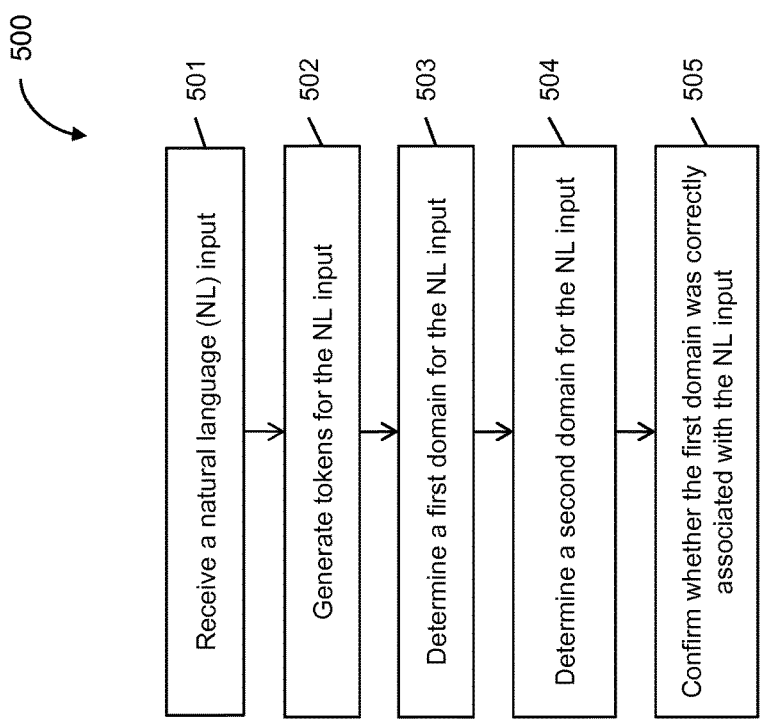
FIG. 5 illustrates a flow diagram for a method to determine and/or confirm whether a domain match determined for a natural language input is correct, according to an implementation of the present disclosure.

FIG. 5 illustrates a flow diagram of a method to determine and/or confirm a domain match determined for the NL input, according to an implementation of the disclosure. In an operation 501, e.g., responsive to determining that the zero-pass processing of the NL input has failed, the NL input is received for natural language processing/understanding, e.g., at NLP/NLU engine(s) 230.

In an operation 502, one or more tokens for the NL input may be generated. Each of the tokens may correspond to each word or each combination of the words of the NL input. In an operation 503, based on a rules-based semantic pattern matching technique (configured at RNLU engine(s) 310), a first domain (and a corresponding confidence score) to which the NL input belongs may be determined. A feature value set (e.g., number of tokens matched, etc.) associated with the processing the NL input (at engine(s) 310) may also be determined. For example, the tokens are matched to one or more computer-executable tasks and one or more entities, based at least on a sematic grammar. The semantic grammar may be specific to the semantic pattern matching technique used at RNLU engine(s) 310, and may include pre-configured rules based on which an NL input (or tokens thereof) may be structured, parsed and/or understood. The one or more tasks and the one or more entities may also be a part of the semantic grammar associated with the semantic pattern matching technique.

Further, in an operation 504, one or more second domains to which the NL input belongs and corresponding confidence scores may be determined, e.g., based a statistic classification technique (e.g., using a maximum-entropy classifier) configured at SNLU engine(s) 320. To that end, an input feature vector for the NL input may be generated, wherein each element of the input feature vector represents at least one of the one or more tokens of the NL input. The input feature vector may be processed in accordance with the statistic classification technique to determine the second domain(s) and the corresponding confidence score(s).

In an operation 505, based at least on the determined feature value set (from 503) and the confidence score related to the second domain (from 504), it may be confirmed whether the NL input correctly belongs to the first domain (determined at 503). The confirmation aspect at operation 505 may be executed based on another statistic classification technique.

Figure 6:
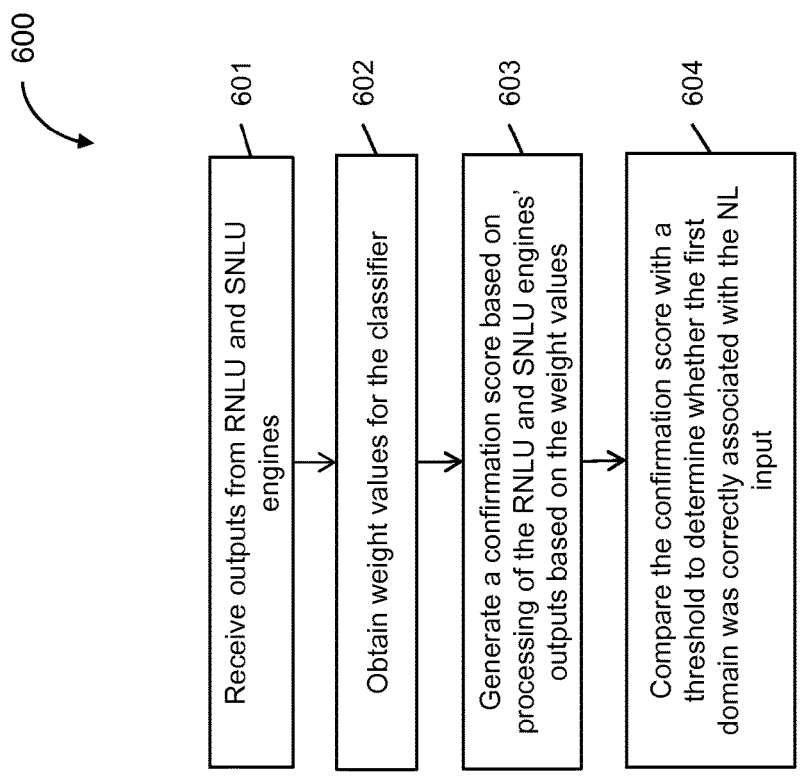
FIG. 6 illustrates a flow diagram for a method to confirm whether a domain match determined for a natural language input is correct, according to an implementation of the present disclosure.

FIG. 6 illustrates a flow diagram of a method to confirm whether the NL input is correctly assigned to the first domain (as identified by the rules-based RNLU engine(s) 310), according to an implementation of the disclosure. In an operation 601, the feature value set, the confidence score(s), and/or other parameters from the RNLU and SNLU engines may be received at classifier engine(s) 330.

In an operation 602, trained coefficient weight values associated with the second statistical classification technique (e.g., based on logistic regression classifier) may be obtained, e.g., from database(s) 130. In an operation 603, at least the received feature value set and the confidence scores may be processed based on the coefficient weight values to determine a confirmation score related to the first domain.

In an operation 604, the confirmation score related to the first domain may be compared with a certain (pre-defined) threshold, and based a result of the comparison (e.g., the confirmation score being higher, lower or equal to the threshold), it may be determined whether the NL input correctly belongs to the first domain. For example, if the confirmation score is greater than the threshold, the NL input is determined to be correctly assigned to the first domain. Once the NL input has been determined to be correctly classified to the first domain, appropriate application(s) 240 are triggered to complete the request action (query or command) of the NL input, and provide a suitable response to the user.

Figure 10:
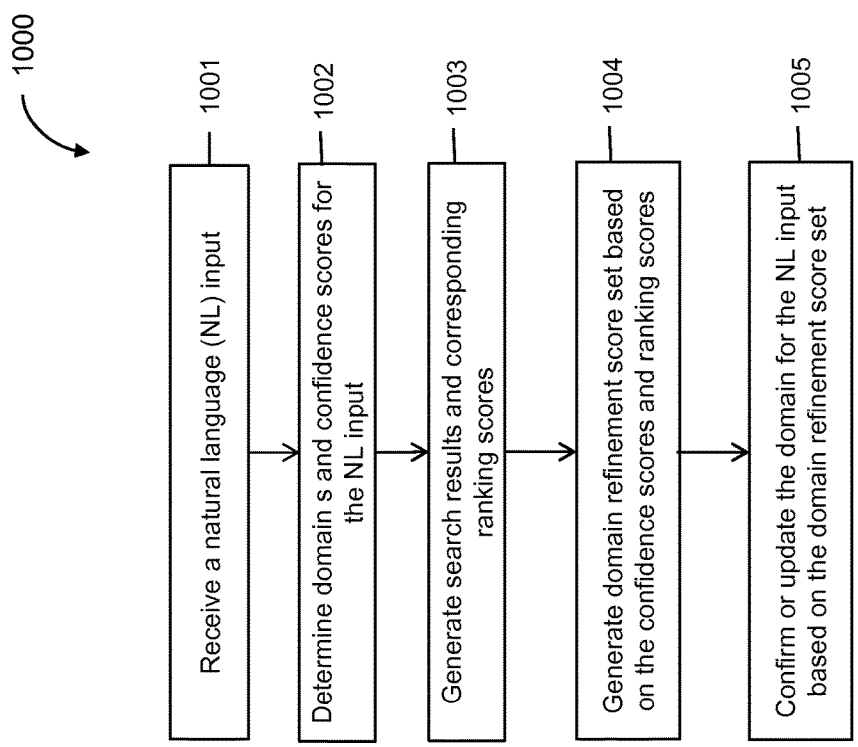
FIG. 10 illustrates a flow diagram for a method to determine and/or refine a domain match determined for a natural language input, according to an implementation of the present disclosure.

FIG. 10 illustrates a flow diagram of a method to determine a domain match for an NL input based on information from search results related to the NL input, according to an implementation of the disclosure. In an operation 1001 (e.g., responsive to determining that the zero-pass processing of the NL input has failed), the NL input is received for natural language processing/understanding, e.g., at NLP/NLU engine(s) 230.

In an operation 1002, based on a rules-based semantic pattern matching technique (configured at RNLU engine(s) 310) and/or a statistical classification technique (configured at SNLU engine(s) 320), one or more domains and a corresponding confidence score set for the NL input belongs is determined.

Further, in an operation 1003, the NL input is processed by database service 920 as a search query, and search results relevant to the NL input are generated. Search results may be ranked, and are assigned ranking scores (e.g., for each search result or each category of search results).

In an operation 1004, the domain confidence scores and the search results ranking scores are processed, e.g., by domain refinement engine(s) 930, to determine whether the domain decided upon by RNLU engine(s) 310/SNLU engine(s) 320 is correct, and generate a binary value to indicate that determination, and generate a refinement score set for each of the considered domains.

In an operation 1005, the domain that has the highest score in the refinement score set is selected as the final domain for the NL input, and the requested action or task and appropriate application to execute the task are determined.

Other implementations, uses and advantages of the invention will be apparent to those skilled in the art from consideration of the specification and practice of the present disclosure. The specification should be considered exemplary only, and the scope of the invention is accordingly intended to be limited only by the following claims.

What is claimed is:

1. A computer-implemented method to confirm whether a domain determined for a natural language input using a semantic pattern matching technique is correct based on outputs of the semantic pattern matching technique and a domain determined for the natural language input and outputs using statistics-based natural language processing, the method being implemented on a computer system having one or more physical processors programmed with computer program instructions which, when executed, perform the method, the method comprising:

receiving, at the computer system, a natural language (NL) input;

determining, by the computer system, based on the semantic pattern matching technique, a first information domain for the NL input, and a feature value set comprising information indicating a first confidence score from the semantic pattern matching technique, the first confidence score indicating a level of confidence that the first information domain for the NL input determined by the semantic pattern matching technique is correct;

determining, by the computer system, based on the statistics-based natural language processing, a second information domain for the NL input, and a second confidence score indicating a level of confidence that the second information domain for the NL input determined by the statistics-based natural language processing is correct;

providing, by the computer system, the first information domain determined by the semantic pattern matching technique, the feature value set, the second information domain determined by the statistics-based natural language processing, and the second confidence score as input to a classifier engine;

determining, by the computer system, using the classifier engine, a third confidence score different from both the first confidence score and the second confidence score, that indicates a level of confidence that the first information domain determined by the semantic pattern matching technique has been confirmed as correctly identified based on the first information domain determined by the semantic pattern matching technique, the feature value set, the second information domain determined by the statistics-based natural language processing, and the second confidence score;

comparing, by the computer system, the third confidence score with a predefined threshold confidence score that indicates the first information domain determined by the semantic pattern matching technique is confirmed as correctly identified; and determining, by the computer system, whether the first information domain determined by the semantic pattern matching technique is confirmed based on the comparison.

2. The method of claim 1, wherein the NL input is represented based on one or more tokens, and wherein said determining based on the semantic pattern matching technique comprises matching, by the computer system, based at least on a semantic grammar, the one or more tokens to one or more computer-executable tasks and one or more entities, wherein the one or more tasks and the one or more entities are predefined for the semantic pattern matching technique.

3. The method of claim 2, wherein the feature value set comprises one or more of the following: a. total number of the one or more tokens matched, a fraction number of the one or more tokens matched, a matching score assigned to at least one of the one or more tokens, and a matching score assigned to the NL input.

4. The method of claim 1, wherein the NL input is represented based on one or more tokens, the method further comprising generating, by the computer system, an input feature vector for the NL input, wherein each element of the input feature vector represents at least one of the one or more tokens, wherein said determining the second information domain determined by the statistics-based natural language processing and the second confidence score comprises processing, by the computer system, the input feature vector based on a first statistical classification technique.

5. The method of claim 4, wherein said processing the input feature vector comprises processing, by the computer system, the input feature vector based on the first statistical classification technique to determine a plurality of second information domains for the NL input and a corresponding plurality of confidence scores, wherein each corresponding confidence score of the corresponding plurality of confidence scores is indicative of the likelihood of the corresponding one of the plurality of second information domains being correct.

6. The method of claim 4, further comprising processing, by the computer system, the input feature vector based on the first statistical classification technique to determine a binary check value indicative of whether the second information domain determined by the statistics-based natural language processing is related to one of a plurality of information domains associated with the semantic pattern matching technique, wherein said determining whether the NL input for the first information domain determined by the semantic pattern matching technique is confirmed, is further based on the binary check value.

7. The method of claim 4, wherein the first statistical classification technique is based on one or more of the following:
a maximum-entropy classifier, a logistic regression classifier, a Naive B ayes classifier, and a support vector machine.

8. The method of claim 1, wherein said determining whether the first information domain determined by the semantic pattern matching technique is confirmed, comprises processing, by the computer system, the feature value set and the second confidence score based on a second statistical classification technique.

9. The method of claim 8, wherein said processing the feature value set and the second confidence score based on the second statistical classification technique comprises:
obtaining, by the computer system, coefficient weights associated with the second statistical classification technique for the feature value set and the second confidence score; and
processing, by the computer system, the feature value set and the second confidence score with the coefficient weights based on the second statistical classification technique to determine the third confirmation score.

10. The method of claim 1, wherein the NL input comprises a spoken NL utterance.

11. A system to confirm whether a domain determined for a natural language input using a semantic pattern matching technique is correct based on outputs of the semantic pattern matching technique and a domain determined for the natural language input and outputs using statistics-based natural language processing, the system comprising:
one or more physical processors programmed with computer program instructions which, when executed, cause the one or more physical processors to:
receive a natural language (NL) input;
determine, based on the semantic pattern matching technique, a first information domain for the NL input, and a feature value set comprising information indicating first confidence score from the semantic pattern matching technique, the first confidence score indicating a level of confidence that the first information domain for the NL input determined by the semantic pattern matching technique is correct;
determine, based on the statistics-based natural language processing, a second information domain for the NL input, and a second confidence score indicating a level of confidence that the second information domain for the NL input determined by the statistics-based natural language processing is correct;
provide the first information domain determined by the semantic pattern matching technique, the feature value set, the second information domain determined by the statistics-based natural language processing, and the second confidence score as input to a classifier engine;
determine, using the classifier engine, a third confidence score that indicates a level of confidence that the first information domain determined by the semantic pattern matching technique has been confirmed as correctly identified based on the first information domain determined by the semantic pattern matching technique, the feature value set, the second information domain determined by the statistics-based natural language processing, and the second confidence score;
compare the third confidence score with a predefined threshold confidence score that indicates the first information domain determined by the semantic pattern matching technique is confirmed as correctly identified; and
determine whether the first information domain determined by the semantic pattern matching technique is confirmed based on the comparison.

12. The system of claim 11, wherein the NL input is represented using one or more tokens, and wherein, to determine based on the semantic pattern matching technique, the one or more physical processors are further caused to match, based at least on a semantic, grammar, the one or more tokens to one or more computer-executable tasks and one or more entities, wherein the one or more tasks and the one or more entities are predefined for the semantic pattern matching technique.

13. The system of claim 12, wherein the feature value set comprises one or more of the following: a total number of the one or more tokens matched, a fraction number of the one or more tokens matched, a matching score assigned to at least one of the one or more tokens, and a matching score assigned to the NL input.

14. The system of claim 11, wherein the NL input is represented based on one or more tokens, and wherein the one or more physical processors are further caused to:
generate an input feature vector for the NL input, wherein each element of the input feature vector represents at least one of the one or more tokens, and to determine the second information domain determined by the statistics-based natural language processing and the second confidence score, process the input feature vector based on a first statistical classification technique.

15. The system of claim 14, wherein, to process the input feature vector, the one or more physical processors are further caused to process the input feature vector based on the first statistical classification technique to determine a plurality of second information domains for the NL input and a corresponding plurality of confidence scores, wherein each corresponding confidence score of the corresponding plurality of confidence scores is indicative of the likelihood of the corresponding one of the plurality of second information domains being correct.

16. The system of claim 14, wherein the one or more physical processors are further caused to process the input feature vector based on the first statistical classification technique to determine a binary check value indicative of whether the second information domain determined by the statistics-based natural language processing is related to one of a plurality of information domains associated with the semantic pattern matching technique, wherein, a determination of whether the NL, input for the first information domain determined by the semantic pattern matching technique is confirmed, is further based on the binary check value.

17. The system of claim 14, wherein the first statistical classification technique is based on one or more of the following: a maximum-entropy classifier, a logistic regression classifier, a Naive Bayes classifier, and a support vector machine.

18. The system of claim 11, wherein, to determine whether the first information domain determined by the semantic pattern matching technique is confirmed, comprises processing, by the computer system, the feature value set and the second confidence score based on a second statistical classification technique.

19. The system of claim 18, wherein, to process the feature value set and the second confidence score based on the second statistical classification technique, the one or more physical processors are further caused to:
   obtain coefficient weights associated with the second statistical classification technique for the feature value set and the second confidence score; and
   process the feature value set and the second confidence score with the coefficient weights based on the second statistical classification technique to determine the third confirmation score.

20. The system of claim 11, wherein the NL input comprises a spoken NL, utterance.

* * * * *